(12) United States Patent
Beardsley et al.

(10) Patent No.: US 6,304,980 B1
(45) Date of Patent: Oct. 16, 2001

(54) PEER-TO-PEER BACKUP SYSTEM WITH FAILURE-TRIGGERED DEVICE SWITCHING HONORING RESERVATION OF PRIMARY DEVICE

(75) Inventors: Brent Cameron Beardsley; James Lincoln Iskiyan; William Frank Micka, all of Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/234,806

(22) Filed: Jan. 19, 1999

Related U.S. Application Data

(63) Continuation-in-part of application No. 08/614,588, filed on Mar. 13, 1996, now Pat. No. 5,870,537.

(51) Int. Cl.[7] .................................................. G06F 11/00

(52) U.S. Cl. .............................. 714/6; 707/204; 711/162

(58) Field of Search ............................... 714/5, 6, 15, 20, 714/775; 711/100, 112, 162; 707/202, 204; 710/100, 131; 712/220

(56) References Cited

U.S. PATENT DOCUMENTS

| | | | |
|---|---|---|---|
| 3,623,014 | 11/1971 | Doetz et al. | 340/172.5 |
| 4,396,984 | 8/1983 | Videki, II | 364/200 |
| 4,455,605 | 6/1984 | Cormier et al. | 364/200 |
| 5,404,508 | 4/1995 | Konrad et al. | 395/600 |
| 5,574,863 | 11/1996 | Nelson et al. | 395/200.08 |
| 5,594,900 | 1/1997 | Cohn et al. | 395/600 |
| 5,604,862 | 2/1997 | Midgely et al. | 395/182.04 |
| 5,608,865 | 3/1997 | Midgely et al. | 395/180 |
| 5,615,329 | 3/1997 | Kern et al. | 395/182.04 |
| 5,619,644 | 4/1997 | Crockett et al. | 395/183.21 |
| 5,621,884 | 4/1997 | Beshears et al. | 395/182.08 |

(List continued on next page.)

OTHER PUBLICATIONS

"Direct and Indirect Accessing of Peripheral Devices", IBM Technical Disclosure Bulletin, vol. 33, No. 1A, Jun. 1990.
H. D. Meij et al., "P/DAS and Enhancements to the IBM 3990–6 and RAMAC Array Family", May 1996.
"Maintaining Data Integrity Across Redundant I/O Device Take–Overs", IBM Technical Disclosure Bulletin, vol. 36, No. 06A, Jun. 1993, pp. 577–578.

*Primary Examiner*—Gopal C. Ray
(74) *Attorney, Agent, or Firm*—Dan Hubert & Assoc.

(57) ABSTRACT

A peer-to-peer backup storage system automatically switches from a primary storage site to a mirrored backup site in response to a primary site failure, where the secondary site then honors any existing host initiated reservation of primary storage. Each site includes a storage controller and storage, where the primary site receives and stores data and forwards the received data to the secondary site for storage to mirror contents of primary storage. The primary and secondary sites are coupled to one or more hosts. Whenever the primary controller receives a reserve request from a host, it reserves the primary storage (or a subpart thereof) for the exclusive use of the reserve-initiating host. This may involve, for example, the primary controller storing a path group ID that identifies the reserving host. The primary controller also notifies the secondary controller of the reservation, e.g., sending the path group ID involved in the reservation operation to the secondary site. Responsive to a primary site failure, the system performs "switch" operation where the system stops forwarding data from the primary site to the secondary site. Furthermore, the secondary site is operated in substitution for the primary site, to receive and store data from the hosts. Importantly, the secondary site honors the existing reservation of the primary storage by reserving the secondary storage to the first reserve-initiating host.

24 Claims, 14 Drawing Sheets

U.S. PATENT DOCUMENTS

| | | | |
|---|---|---|---|
| 5,644,698 | 7/1997 | Cannon | 39/182.04 |
| 5,673,382 | 9/1997 | Cannon et al. | 395/182.04 |
| 5,680,580 | 10/1997 | Beardsley et al. | 395/489 |
| 5,682,513 | 10/1997 | Candelaria et al. | 395/440 |
| 5,692,155 | 11/1997 | Iskiyan et al. | 395/489 |
| 5,870,537 * | 2/1999 | Kern et al. | |

* cited by examiner

PEER-TO-PEER BACKUP SYSTEM WITH FAILURE-TRIGGERED DEVICE SWITCHING HONORING RESERVATION OF PRIMARY DEVICE

CROSS-REFERENCE TO RELATED APPLICATIONS

This application is a continuation-in-part of U.S. Ser. No. 08/614,588, U.S. Pat. No. 5,870,537, entitled "Concurrent Switch to Shadowed Device For Storage Controller and Device Errors," filed Mar. 13, 1996, in the name of Robert Kern, Michael Paulsen, William Shephard, and Harry Yudenfriend, and presently assigned to International Business Machines Corp. (IBM).

BACKGROUND OF THE INVENTION

1. Field of the Invention

The present invention generally relates to data backup systems. More particularly, the invention concerns a data storage system with primary and redundant backup storage, where the system automatically switches to the mirroring backup storage when an error occurs at the primary storage, and any reservation of the primary storage to a particular host is honored by the secondary storage.

2. Description of the Related Art

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory (DRAM or SRAM). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA) typically includes one or more read/write heads, and is provided in each DASD for moving across the tracks to transfer the data to and from the surface of the disks as the disks are rotated past the read/write heads. DASDs can store gigabytes of data, and the access to such data is typically measured in milliseconds (orders of magnitudes slower than electronic memory). Access to data stored on DASD is slower than electronic memory due to the need to physically position the disk and HDA to the desired data storage location.

A third or lower level of data storage includes tapes, tape libraries, and optical disk libraries. Access to library data is much slower than electronic or DASD storage because a robot is necessary to select and load the needed data storage medium. An advantage of these storage systems is the reduced cost for very large data storage capabilities, on the order of terabytes of data. Tape storage is often used for backup purposes. That is, data stored at the higher levels of data storage hierarchy is reproduced for safe keeping on magnetic tape. Access to data stored on tape and/or in a library is presently on the order of seconds.

Having a backup data copy is mandatory for many businesses for which data loss would be catastrophic. The time required to recover lost data is also an important recovery consideration. With tape or library backup, primary data is periodically backed-up by making a copy on tape or library storage. One improvement over this arrangement is "dual copy," which mirrors contents of a primary device with a nearly identical secondary device. An example of dual copy involves providing additional DASDs so that data is written to the additional DASDs substantially in real time along with the primary DASDs. Then, if the primary DASDs fail, the secondary DASDs can be used to provide otherwise lost data. A drawback to this approach is that the number of required DASDs is doubled.

A different data backup alternative that avoids the need to provide double the storage devices involves writing data to a redundant array of inexpensive devices (RAID). In this configuration, the data is apportioned among many DASDs. If a single DASD fails, then the lost data can be recovered by applying error correction procedures to the remaining data. Several different RAID configurations are available.

The foregoing backup solutions are generally sufficient to recover data in the event that a storage device or medium fails. These backup methods are useful only for device failures since the secondary data is a mirror of the primary data, that is, the secondary data has the same volume serial numbers (VOLSERs) and DASD addresses as the primary data. Data recovery due to system failures or storage controller failures, on the other hand, is not available using mirrored secondary data. Hence still further protection is required for recovering data if the entire system or even the site is destroyed by a disaster such as an earthquake, fire, explosion, hurricane, etc. Disaster recovery requires that the secondary copy of data be stored at a location remote from the primary data. A known method of providing disaster protection is to periodically backup data to tape, such as a daily or weekly basis. The tape is then picked up by a vehicle and taken to a secure storage area usually located kilometers from the primary data location. Nonetheless, this backup plan has its problems. First, it may take days to retrieve the backup data, and additional data is lost waiting for the backup data to be recovered. Furthermore, the same disaster may also destroy the storage location. A slightly improved backup method transmits data to a backup location each night. This allows the data to be stored at a more remote location. Again, some data may be lost between backups since backups do not occur continuously, as in the dual copy solution. Hence, a substantial amount of data may still be lost and this may be unacceptable to some users.

More recently introduced data disaster recovery solutions include "remote dual copy," where data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers. The secondary or remote location, in addition to providing a backup data copy, must also have enough system information to take over processing for the primary system should the primary system become disabled. This is due in part because a single storage controller does not write data to both primary and secondary DASD strings at the primary and secondary sites. Instead, the primary data is stored on a primary DASD string attached to a primary storage controller while the secondary data is stored on a secondary DASD string attached to a secondary storage controller.

The secondary site must not only be sufficiently remote from the primary site, but must also be able to backup primary data in real time. The secondary site needs to backup primary data in real time as the primary data is updated, with some minimal delay. Additionally, the secondary site has to backup the primary data regardless of the application program (e.g., IMS, DB2) running at the primary site and generating the data and/or updates. A difficult task required of the secondary site is that the secondary data must be "order consistent," that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

Remote data duplexing falls into two general categories, synchronous and asynchronous. Synchronous remote copy involves sending primary data to the secondary location and confirming the reception of such data before ending a primary DASD input/output (I/O) operation (e.g., providing a channel end (CE) and device end (DE) to the primary host). Synchronous copy, therefore, slows the primary DASD I/O response time while waiting for secondary confirmation. Primary I/O response delay is increased proportionately with the distance between the primary and secondary systems, a factor that limits the remote distance to tens of kilometers. Synchronous copy, however, provides sequentially consistent data at the secondary site with relatively little system overhead.

Synchronous remote copy for disaster recovery also requires that paired DASD volumes form a set. The DASD volumes at the secondary site essentially form a "duplex pair" with the corresponding DASD volumes at the primary site. Forming such a set further requires that a sufficient amount of system information be provided to the secondary site for identifying those DASD volumes (VOLSERs) that pair with DASD volumes at the primary site. The secondary site must also recognize when a DASD volume is "failed duplex," i.e., when a DASD at the secondary site is no longer synchronized with its primary site counterpart. The primary site can suspend remote copy to allow the primary site to continue locally implementing data updates while these updates are queued for the secondary site. The primary site marks these updates to show the secondary site is no longer synchronized.

Synchronous remote copy disaster recovery systems have the desired ability to suspend the remote copy pair and queue the updates to be subsequently transferred to the secondary site because of their synchronous design. The host application at the primary site cannot start the next I/O transfer to the primary storage controller until the previous I/O transfer has been synchronized at the secondary site. If the previous I/O was not successfully transmitted to the secondary site, the remote copy pair must be suspended before the subsequent I/O transfer is started. Subsequent I/O transfers to this remote copy pair are queued for later transmittal to the secondary site once the remote copy pair is reestablished.

In contrast to synchronous remote copy, asynchronous remote copy provides better primary application system performance because the primary DASD I/O operation is completed (providing a channel end (CE) and device end (DE) to the primary host) without waiting for data to be confirmed at the secondary site. Therefore, the primary DASD I/O response time is not dependent upon the distance to the secondary site and the secondary site can be thousands of kilometers remote from the primary site. A greater amount of system overhead is required, however, to ensure data sequence consistency since data received at the secondary site can be out of order with respect to the primary updates. Also, a failure at the primary site can result in some data being lost that was in transit between the primary and secondary locations.

Further, certain errors in the data processing system at the primary site, either in the host application or in the storage subsystem, can cause the termination of the remote copy function. Unlike synchronous remote copy designs, most asynchronous remote copy systems cannot suspend the remote copy duplex pair. Once remote copy has been terminated, resumption of the remote copy function requires all data from the primary DASDs to be copied to the secondary DASDs to ensure re-synchronization of the two sites.

One recent development in the area of remote data duplexing has been seamless "switching"(also called "swapping") of host directed I/O operations from a primary storage device to a secondary storage device when a failure occurs on the primary storage controller or a primary storage device. This development was made by IBM engineers, and is known as peer-to-peer dynamic address switching (PDAS). PDAS operates in a "peer-to-peer environment" where the primary storage site transfers its received updates directly to a mirroring backup storage site (the primary's peer). The peer-to-peer environment contrasts with backup environments that use an independent processor, called a "data mover," to retrieve and transfer data between primary and the secondary site.

PDAS operates by first quiescing all I/O operations and record updates targeted to the primary data storage device from application programs of a primary host processor. This technique further verifies that the primary and secondary data storage devices form a remote copy duplex pair in full duplex mode ensuring data integrity in that the secondary data storage is an exact replica of the primary data storage device. Next, the secondary data storage device is swapped with the primary data storage device by terminating the remote copy duplex pair, establishing an opposite direction remote copy duplex pair such that the secondary data storage device is a primary device of the remote copy duplex pair and the primary data storage device is a shadowing device, and then updating the application programs running in the primary host processor with a device address of the secondary data storage device substituted as a device address of the primary data storage device. Finally, PDAS resumes all I/O operations and record updates from the application programs running in the primary host processor such that all subsequent I/O operations and record updates targeted for the primary data storage device are directed through a secondary storage controller to the secondary data storage device. PDAS is more thoroughly discussed in U.S. application Ser. No. 08/614,588, entitled "Concurrent Switch to Shadowed Device for Storage Controller and Device Errors," which was filed on Mar. 13, 1996, in the names of Robert Kern et al., and assigned to IBM. Contents of the foregoing application are hereby incorporated by reference into the present application.

Peer-to-peer dynamic address switching (PDAS) has proven to be a useful addition to peer-to-peer remote copy systems, assisting with the smooth and error-free transition between a failed primary storage site and its mirroring secondary storage site. Even though this development represents a significant advance and enjoys some commercial success today, IBM continually strives to improve the performance and efficiency of their products, including the IBM backup storage systems. In this respect, one possible area of focus concerns the operation of PDAS when the primary storage device is subject to a "reserve" state. Generally, hosts issue reserve commands to logical devices to exclude other hosts from writing to the reserved device. By using reserve commands, the host can protect its ability to update the reserved storage device "atomically" (i.e., without any intervening reads or writes by other hosts). However, the seamless transition between the failed (reserved) primary storage device and its backup counterpart is difficult or impossible when a failure occurs and the primary device is reserved. In some cases where the failed device is reserved, the PDAS operation may even fail. Even if the PDAS operation succeeds, the backup device (now operating as the primary device) will fail to honor any reserves that were active on the primary device upon failure, possibly causing uncompleted operations of the reserving host to fail. Consequently, due to certain unsolved problems, peer-to-peer dynamic address switching (PDAS) may not be completely satisfactory for some particular applications where device reservations are involved.

SUMMARY OF THE INVENTION

Broadly, the present invention concerns a data storage system employing a primary storage and redundant backup storage, where the system automatically switches to the mirroring backup storage when a failure occurs at the primary storage, and the secondary storage honors any existing reservation of primary storage to a particular host.

The invention is implemented in a peer-to-peer backup system including a primary storage site having a counterpart secondary storage site. Each site includes a storage controller and a storage, where the primary site receives and stores data and forwards the received data to the secondary site for storage therein to mirror contents of the primary site. The primary and secondary sites are coupled to one or more hosts. Whenever the primary controller receives a reserve command from one of the hosts, the primary controller reserves the primary storage for the exclusive use of the reserve-initiating host. This may involve, for example, the primary controller storing a path group identifier (PGID) that identifies the reserving host. The primary controller also notifies the secondary controller of the reservation. This operation may be performed, for example, by notifying the secondary site of the PGID involved in the reservation operation.

A "switch" operation is performed whenever the data storage system experiences certain types of failures in the primary controller or primary storage. In the switch operation, the system stops forwarding data from the primary site to the secondary site. Furthermore, the secondary site is operated in substitution for the primary site, to receive and store data from the hosts. Importantly, the secondary site honors the previous reservation of the primary storage by reserving the secondary storage to the first reserve-initiating host.

Accordingly, one embodiment of the invention concerns a method for operating a storage system to switch from primary to backup storage in response to an error, where the backup storage honors any host's preexisting reservation of primary storage. Another embodiment of the invention provides an apparatus, such as a backup storage system, configured to switch from primary to backup storage in response to an error, where the backup storage honors any host's preexisting reservation of primary storage. In still another embodiment, the invention may be implemented to provide a signal-bearing medium tangibly embodying a program of machine-readable instructions executable by a digital data processing apparatus to perform method steps for switching from primary to backup storage in response to an error, where the backup storage honors any host's preexisting reservation of primary storage.

The invention affords its users with a number of distinct advantages. In contrast to previous arrangements, where device reservations were dropped or caused the switch procedure to fail, the invention facilitates a smooth and convenient process of swapping from primary to backup storage. This helps ensure that the transition to backup storage can occur without data loss or difficulty to the user and any related application programs. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a data storage system with primary and redundant backup storage, where the system automatically switches to the mirroring backup storage when a failure occurs at the primary storage, and any reservation of the primary storage to a particular host is honored by the secondary storage.

Figure 1:
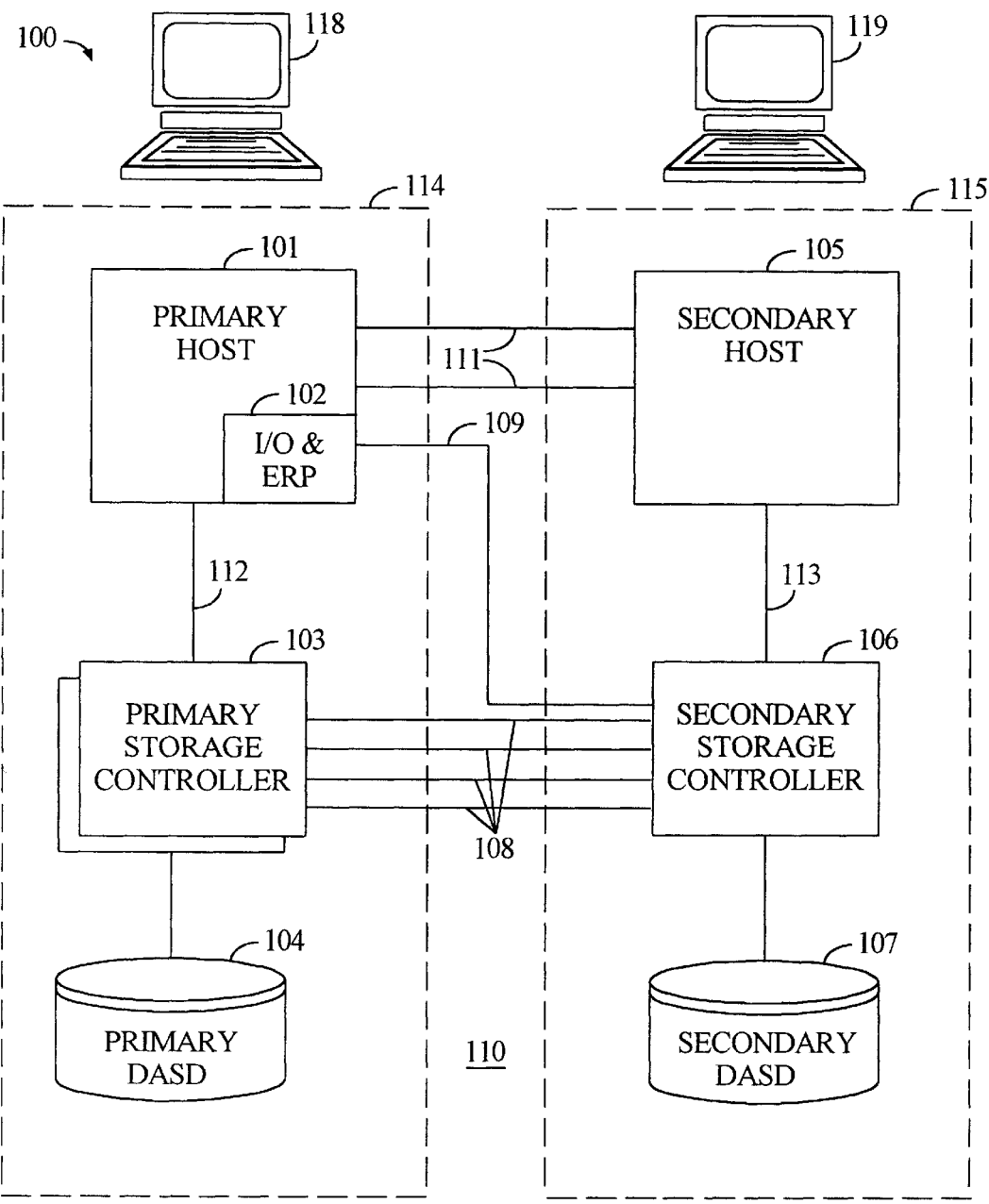
FIG. 1 is a block diagram of a the hardware components and interconnections of a disaster recovery system having synchronous remote copy capabilities, in accordance with the invention.

Hardware Components & Interconnections
Synchronous Disaster Recovery System The invention will be described as embodied in a data processing system incorporating remote data duplexing for disaster recovery. Turning now to FIG. 1, a disaster recovery system 110 is shown having a primary site 114 and a secondary site 115. The secondary site 115 may be remotely located, e.g., twenty kilometers apart from the primary site 114. The primary site 114 includes a host processor 101 ("primary processor") that is running an application and system I/O and error recovery program 102 (I/O ERP). The primary processor 101 may comprise, for example, an IBM Enterprise Systems/9000 (ES/9000) processor running IBM data facility storage management subsystem/multiple virtual systems (DFSMS/MVS) software and further may have several application programs running thereon. A primary storage controller 103, for example, an IBM 3990 Model 6 storage controller, is connected to the primary processor 101 via a channel 112. As is known in the art, several such primary storage controllers 103 may be connected to the primary processor 101, or alternately, several primary processors 101 may be attached to the primary storage controllers 103. A primary DASD 104, for example, an IBM 3390 or RAMAC DASD, is connected to the primary storage controller 103. Several primary DASDs 104 may be connected to the primary storage controller 103. The primary storage controller 103 and attached primary DASD 104 form a primary storage subsystem. Further, the primary storage controller 103 and the primary DASD 104 may be a single integral unit.

The secondary site 115 includes a secondary host processor 105 ("secondary processor"), for example, an IBM ES/9000, connected to a secondary storage controller 106, for example an IBM 3990 Model 6, via a channel 113. A secondary DASD 107 is further connected to the secondary storage controller 106. The primary processor 101 is connected to the secondary processor 105 by at least one host-to-host communication link 111, for example, channel links or telephone T1/T3 line links, etc. The primary processor 101 may also have direct connectivity with the secondary storage controller 106 by, for example, multiple Enterprise Systems Connection (ESCON) links 109. As a result, the I/0 ERP 102 can communicate, if required, with the secondary storage controller 106. The primary storage controller 103 communicates with the secondary storage controller 106 via multiple peer-to-peer links 108, for example, multiple ESCON links.

When a write I/O operation is executed by an application program running in the primary processor 101, a hardware status channel end/device end (CE/DE) is provided indicating the I/O operation completed successfully. Primary processor 101 operating system software marks the application write I/O successful upon successful completion of the I/O operation, thus permitting the application program to continue to a next write I/O operation which may be dependent upon the first or previous write I/O operation having successfully completed. On the other hand, if the write I/O operation was unsuccessful, the I/O status of channel end/device end/unit check (CE/DE/UC) is presented to the primary processor 101 operating system software. When unit check is presented, the I/O ERP 102 takes control obtaining specific sense information from the primary storage controller 103 regarding the nature of the failed write I/O operation. If a unique error to a volume occurs, then a unique status related to that error is provided to the I/O ERP 102. The I/O ERP 102 can thereafter perform new peer-to-peer synchronization error recovery for maintaining data integrity between the primary storage controller 103 and the secondary storage controller 106, or in the worst case, between the primary processor 101 and the secondary processor 105.

Consequently, the disaster recovery system 110 accomplishes outboard synchronous remote copy such that a primary host process error recovery procedure having an I/O order, or channel command word (CCW), may change a status of a primary and secondary synchronous remote copy volume from duplex pair to failed duplex. This helps maintain data integrity for several types of primary and secondary subsystem errors. This disaster recovery system 110 provides storage-based backup, rather than application-based backup, where data updates are duplicated in real time. In addition, the host processors 101, 105 within the disaster recovery system 110 can maintain the status of the remote copy duplex pair 104, 107. The applications running within the host processors 101,105 can establish, suspend, or terminate the remote copy duplex pair 104, 107. The host processors 101, 105 send control commands over the communication links 112, 113 to the storage controllers 103, 106 according to the action to be taken regarding the duplex pair 104, 107. The applications then update channel and device control blocks within the subsystem to reflect the current status of the remote copy duplex pair 104, 107.

Asynchronous Disaster Recovery System

Figure 2:
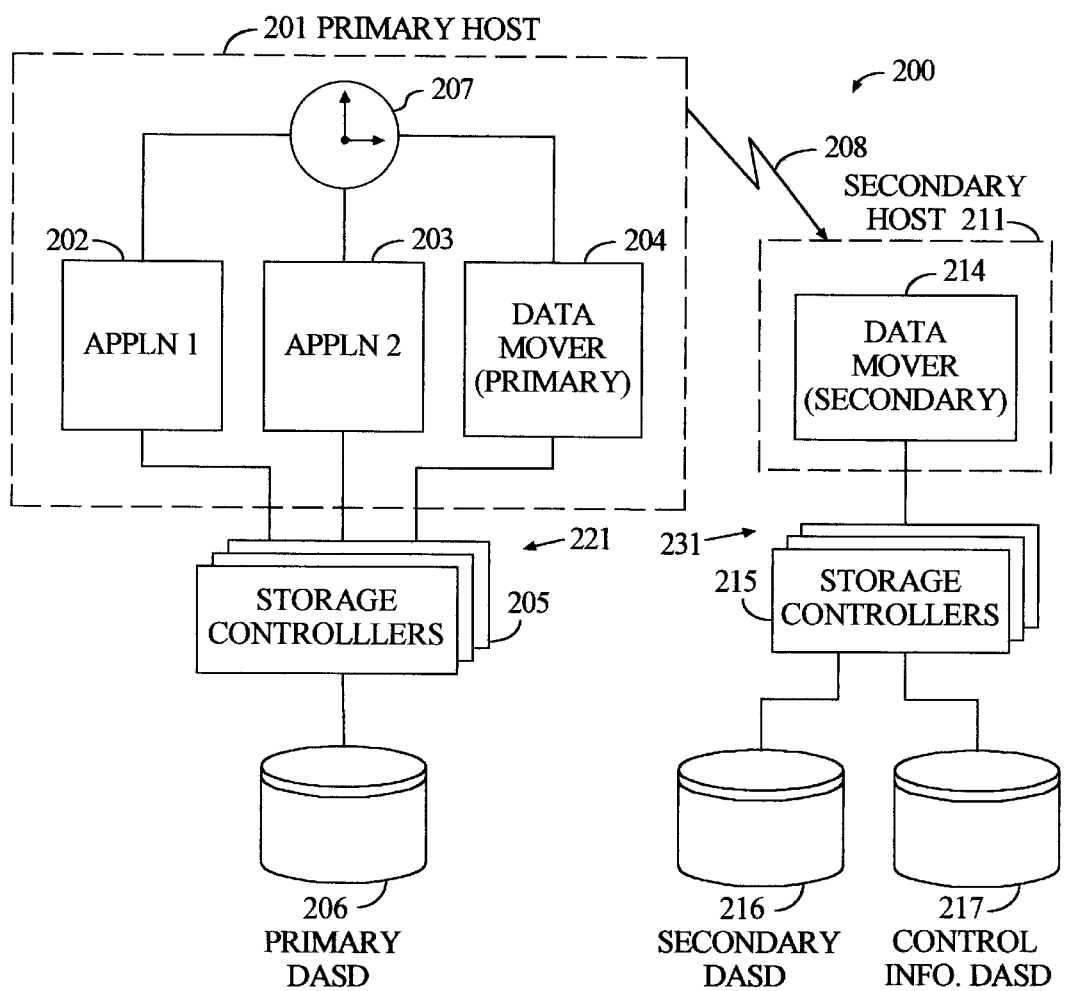
FIG. 2 is a block diagram of a disaster recovery system having asynchronous remote copy capabilities, according to the invention.

FIG. 2 depicts an asynchronous disaster recovery system 200 including a primary site 221 and a remote or secondary site 231. The primary site 221 includes a primary host 201 ("primary processor"), for example, an IBM ES/9000 running IBM DFSMS/MVS host software. The primary processor 201 further includes application programs 202 and 203 (e.g., IMS and DB2 applications) and a primary data mover 204. A common sysplex clock 207 is included in the primary processor 201 to provide a common time reference to all applications (202, 203) running therein, where all system clocks or time sources (not shown) synchronize to the sysplex clock 207 ensuring all time dependent processes are properly timed relative to one another. The primary storage controllers 205, for example, synchronize to a resolution appropriate to ensure differentiation between record write update times, such that no two consecutive write I/O operations to a single primary storage controller 205 can exhibit the same time stamp value. The resolution, and not the accuracy, of the sysplex timer 207 is critical. The primary data mover 204, though shown connected to the sysplex timer 207, is not required to synchronize to the sysplex timer 207 since write I/O operations are not generated therein. A sysplex timer 207 is not required if the primary processor 201 has a single time reference (for example, a single multi-processor ES/9000 system).

Multiple primary storage controllers 205, for example, IBM 3900 Model 6 storage controllers, are connected to the primary processor 201 via a plurality of channels, for example, fiber optic channels. Connected to each primary storage controller 205 is at least one string of primary DASDs 206, for example, IBM 3390 or RAMAC DASDs. The primary storage controllers 205 and the primary DASDs 206 form a primary storage subsystem. Each storage controller 205 and primary DASD 206 need not be separate units, but may be combined into a single enclosure.

The secondary site 231, which may be located thousands of kilometers remote from the primary site 221, is similar to the primary site 221 and includes a secondary host 211 ("secondary processor") having a secondary data mover 214 operating therein. Alternatively, the primary and secondary sites may reside at the same location, and further, the primary and secondary data movers 204, 214 may reside on a single host processor (e.g., secondary DASDs may be separated by little more than a firewall). As still another alternative, the primary and secondary data movers may be combined, and located at the secondary site 231 for optimum efficiency. In this embodiment, the combined data mover may be coupled directly to both sets of storage controllers 205, 215.

Multiple secondary storage controllers 215 are connected to the secondary processor 211 via channels, for example, fiber optic channels, as is known in the art. Connected to the storage controllers 215 are multiple secondary DASDs 216 and a control information DASD 217. The storage controllers 215 and DASDs 216 and 217 comprise a secondary storage subsystem.

The primary site 221 communicates with the secondary site 231 via a communication link 208. More specifically, the primary processor 201 transfers data and control information to the secondary processor 211 by a communications protocol, for example, a virtual telecommunications access method (VTAM) communication link 208. The communication link 208 may be realized by several suitable communication methods, including telephone (T1, T3 lines), radio, radio/telephone, microwave, satellite, etc.

The asynchronous data shadowing system 200 encompasses collecting control data from the primary storage controllers 205 so that an order of all data writes to the primary DASDs 206 is preserved and applied to the secondary DASDs 216 (preserving the data write order across all primary storage subsystems). The data and control information transmitted to the secondary site 231 must be sufficient such that the presence of the primary site 221 is no longer required to preserve data integrity.

The applications 202, 203 generate data or record updates, these record updates being collected by the primary storage controllers 205 and read by the primary data mover 204. Each of the primary storage controllers 205 groups its respective record updates for an asynchronous remote data shadowing session and provides those record updates to the primary data mover 204 via nonspecific primary DASD 206 Read requests. Transferring record updates from the primary storage controllers 205 to the primary data mover 204 is controlled and optimized by the primary data mover 204 for minimizing the number of START I/O operations and the time delay between each Read, while still maximizing the amount of data transferred between each primary storage controller 205 and the primary processor 201. The primary data mover 204 can vary a time interval between nonspecific Reads to control this primary storage controller-host optimization as well as a currency of the record updates for the secondary DASDs 216.

Collecting record updates by the primary data mover 204 and transmitting those record updates to the secondary data mover 214 while maintaining data integrity requires the record updates to be transmitted for specific time intervals and in appropriate multiple time intervals with enough control data to reconstruct the primary DASDs 206 record Write sequence across all primary storage subsystems to the secondary DASDs 216.

Reconstructing the primary DASDs 206 record Write sequences is accomplished by passing self-describing records from the primary data mover 204 to the secondary data mover 214. The secondary data mover 214 inspects the self-describing records for determining whether any records for a given time interval have been lost or are incomplete.

Exemplary Digital Data Processing Apparatus

Figure 2A:
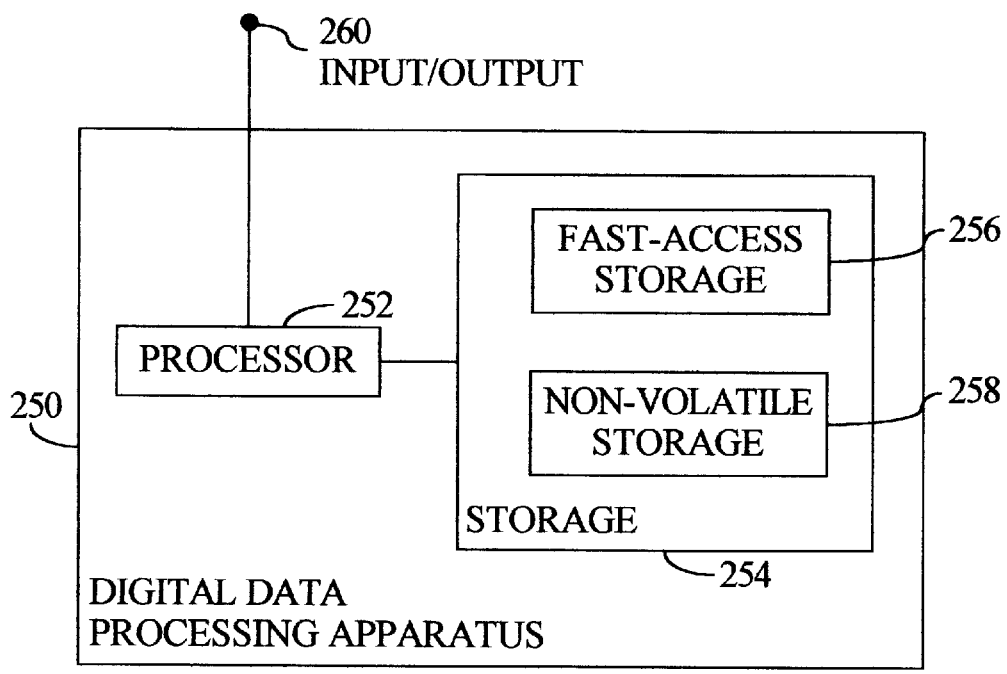
FIG. 2A is a block diagram of a digital data processing machine in accordance with the invention.

Another aspect of the invention concerns a digital data processing apparatus, which may be used to implement the storage controllers 103, 106, 205, 215, the hosts 101, 105, 201, 211, etc. This apparatus may be embodied by various hardware components and interconnections, an example of which is provided by the apparatus 250 (FIG. 2A).

The apparatus 250 includes a processor 252, such as a microprocessor or other processing machine, coupled to a storage 254. In the present example, the storage 254 includes a fast-access storage 256, as well as nonvolatile storage 258. As an example, the fast-access storage 256 may comprise random access memory (RAM), and may be used to store the programming instructions executed by the processor 252. The nonvolatile storage 258 may comprise, for example, one or more magnetic data storage disks such as a "hard drive," a tape drive, or any other suitable storage device. The apparatus 250 also includes an input/output 260, such as a line, bus, cable, electromagnetic link, or other means for exchanging data with the processor 252.

Despite the specific foregoing description, ordinarily skilled artisans (having the benefit of this disclosure) will recognize that the apparatus discussed above may be implemented in a machine of different construction, without departing from the scope of the invention. As a specific example, one of the components 256, 258 may be eliminated; furthermore, the storage 254 may be provided on-board the processor 252, or even provided externally to the apparatus 250.

Storage Controller

Figure 3:
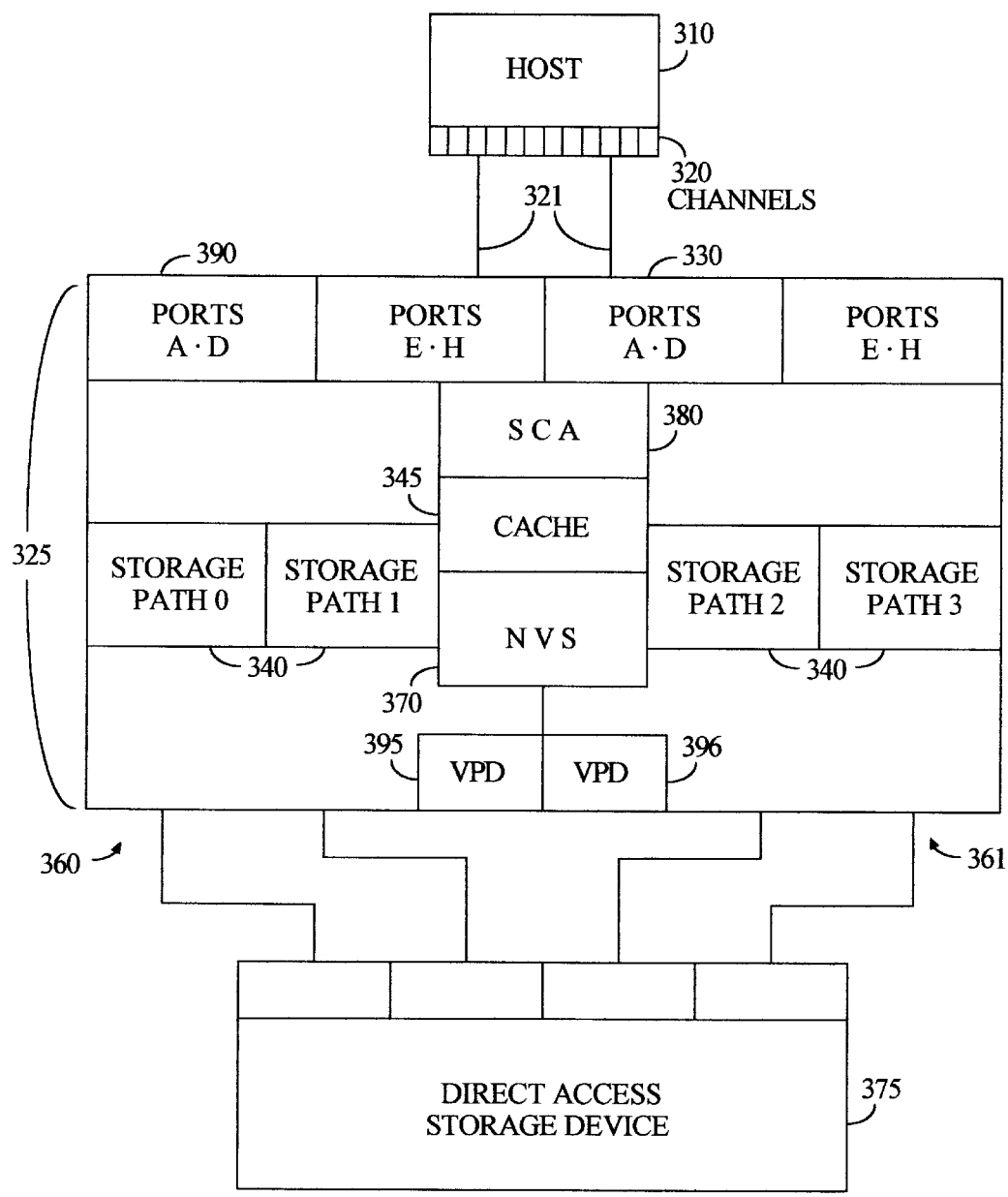
FIG. 3 is a block diagram showing a storage controller in greater detail as connected in a known data storage system.

FIG. 3 provides a more detailed example of a primary or secondary storage site, which includes a host 310, storage controller 325, and DASD 375. The storage controller 325, for example, comprises an IBM 3900 storage controller coupled to the host 310. The host 310 may, for example, comprise an IBM System/370 or IBM Enterprise Systems/ 9000 (ES/9000) processor running IBM DFSMS/MVS software. The storage controller 325 is further connected to a DASD 375, such as an IBM 3390 or RAMAC DASD. A storage subsystem is formed by the storage controller 325 and DASD 375. The storage subsystem is connected to the host processor 310 via communication links 321, where the communication links 321 connect to channels 320 of the host processor 310 and to ports A–D, E–H 330, 390 of the storage controller 325. The communication links 321 may be either parallel or serial links, such as, enterprise system connections (ESCON) serial fiber optic links.

The storage controller 325 includes dual clusters 360 and 361, the dual clusters 360, 361 having separate power supplies (not shown) and including ports A–D, E–H 330, 390 for providing a communication interface thereto. Both nonvolatile storage (NVS) 370 and cache 345 are provided for temporary data storage and are accessible to both clusters 360, 361. Storage paths zero through three (340) provide necessary paths to the DASD 375. Vital product data (VPD) is maintained in VPDs 395 and 396. A storage controller, similar to the storage controller 325 is described in U.S. Pat. No. 5,051,887, assigned to IBM and hereby incorporated by reference.

Figure 4:
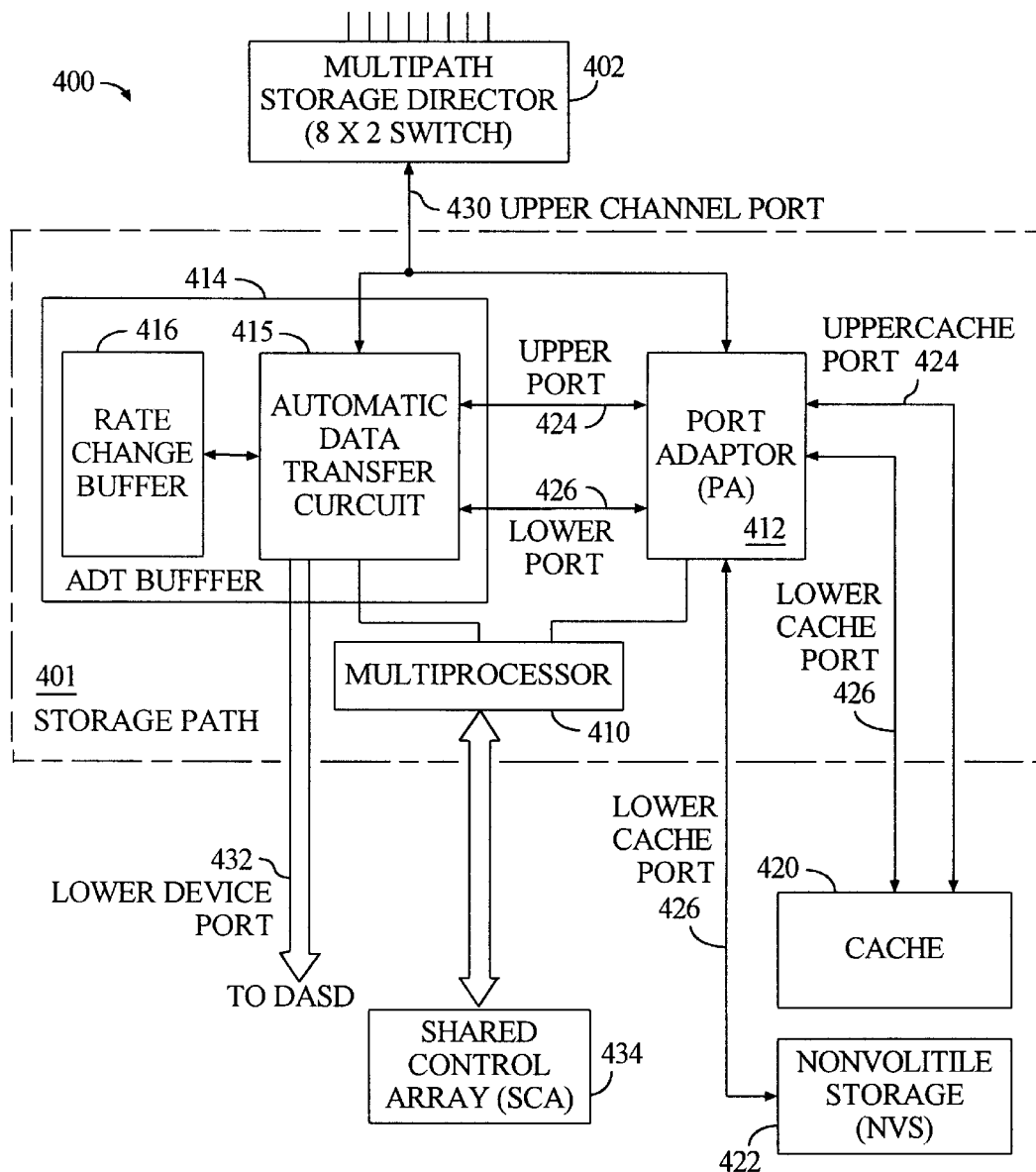
FIG. 4 is a block diagram showing a storage path in greater detail as connected in a storage controller in a data storage system of the invention.

As shown in FIG. 3, the storage controller contains four storage paths, each storage path being identical to the other three. FIG. 4 shows an exemplary one of the storage paths in greater detail, as designated by 401. The storage path 401 is connected to an 8×2 switch 402 by an upper channel port 430 and to a plurality of DASDs by a lower device port 432. The storage path 401 contains a microprocessor 410 that controls all operations taking place within the storage path 401. The microprocessor 410 is capable of interpreting channel commands received from the host processor as well as controlling the attached DASDs. The microprocessor 410 executes microinstructions loaded into a control memory or control store (not shown) through an external support facility.

The storage controller 325 also includes a shared control array 380 (SCA). The SCA is illustrated in greater detail by the SCA 434 of FIG. 4. The SCA contains information shared by all four storage paths of the storage controller. Each microprocessor 410 in the storage path 401 accesses the SCA 434 to obtain shared information. Typical shared information includes certain external registers used by the microprocessors of all four storage paths, device status, and channel reconnection data.

The storage path 401 also contains a port adaptor (PA) 412 which provides data paths and control lines for the transfer of data between cache 420, nonvolatile storage (NVS) 422, and an automatic data transfer (ADT) buffer 414. The ADT buffer 414 includes an ADT circuit 415 and a rate change buffer 416. The rate change buffer 416 compensates for differences between the data transfer rate of the DASD and the host processor to channel connection. This is necessary because data transfer rates between a channel and a storage controller, or channel transfer rates, are typically much higher than data transfer rates between a DASD and a storage controller, or DASD transfer rates.

The port adaptor 412 uses an upper cache port 424 and a lower cache port 426 to provide the data paths between the cache 420, NVS 422, and buffer 414. These two ports 424, 426 allow for two simultaneous transfers involving the cache 420. For example, data can be transferred from the cache 420 to the channel using the upper cache port 424 at the same time data is transferred from the DASD to the cache 420 using the lower cache port 426. Data transfer is initialized by the microprocessor 410 and then once started is controlled by the ADT circuit 415 without microprocessor intervention until completion.

The storage path 401 directs the transfer of data records from the host processor to one of the plurality of DASDs during direct DASD operations, caching operations, or fast write operations. Direct DASD operations involve the transfer of data between the host processor and one of the plurality of DASDs without using cache or NVS for temporary storage of the data. In this case, the storage path 401 uses the ADT buffer 414 to temporarily store the data for transfer to the DASD.

During caching operations, the storage path 401 stores the data in the cache memory 420 and branches the data to the DASD. In this case, the data is transferred into the ADT buffer 414 using the upper channel port 430. The data is then transferred from the ADT buffer 414 to the cache memory 420 using the upper cache port 424 and to the DASD using the lower device port 432. The data remains in the cache memory 420 for a time interval after it is branched to the DASD. If the host processor requests to read the data before it is updated, the storage path 401 can direct the data to be read from the cache 420 thereby increasing the performance of the data processing system.

During fast write operations, the storage path 401 initially stores the data into cache 420 and NVS 422. The data is then destaged from NVS 422 to the DASD at a later time. In this fast write case, the data is transferred into the ADT buffer 414 using the upper channel port 430. The data is then transferred from the ADT buffer 414 to cache 420 using the upper cache port 424 and to NVS 422 using the lower cache port 426. As with caching operations, if the host processor requests to read the data before it is updated, the storage path 401 can direct the data to be read from the cache 420 thereby increasing the performance of the data processing system.

In addition to directing the transfer of data, the storage path 401 also maintains the status of one or more duplex pairs. In the example of FIG. 1, control blocks are kept within the storage controller 103, 106 indicating the duplex pair status of one or more DASDs 104, 107 connected to the storage controller 103, 106. These control blocks generally reside within the SCA 434, but may also stored within the cache 420 or the NVS 422. The storage path sets and resets flags within the control blocks to indicate when the secondary DASD 107 needs to be synchronized with the primary DASD 104. The secondary DASD 107 is synchronized with the primary DASD 104 when all record updates transferred to the primary DASD 104 have also been copied to the secondary DASD 107 through the primary and secondary storage controllers 103, 106. As mentioned previously, the record updates are temporarily stored in the cache 420 and/or the NVS 422 until an exact replica of the record updates has been successfully stored on the secondary DASD 107. The storage path 401 can also respond to a request by the host processor 101, 105 application through the storage controller 103, 106 and the port adaptor 412 to establish a duplex pair 104, 107. The storage path 401 sends the device commands through the lower port adaptor 426. Likewise, the storage path 401 can suspend or terminate a duplex pair 104, 107 when requested by the host processor 101, 105 application or when a device error is detected on either the primary DASD 104 or secondary DASD 107. The storage path 401 again uses the lower port adapter 426 to send the device commands necessary to suspend or terminate the duplex pair. The storage path 401 then communicates to the host processor 101, 105 through the port adaptor 412 that the duplex pair has been suspended or terminated.

Operation

In addition to the various hardware embodiments described above, a different aspect of the invention concerns a method for operating a data storage system to automatically switch from primary storage to a mirroring backup storage when an error occurs at the primary storage, and then proceed to operate the secondary storage in accordance with any existing reservation of primary storage to a particular host.

Signal-Bearing Media

In the context of FIGS. 1–4, such a method may be implemented, for example, by operating the secondary storage controllers (e.g., 106 or 215) and hosts (e.g., 101 or 105), each as embodied by a digital data processing apparatus 250 (FIG. 2A), to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to automatically switch from primary storage to a mirroring backup storage when an error occurs at the primary storage, and then proceed to operate the secondary storage in compliance with any reservation of the primary storage to a particular host.

Figure 13:
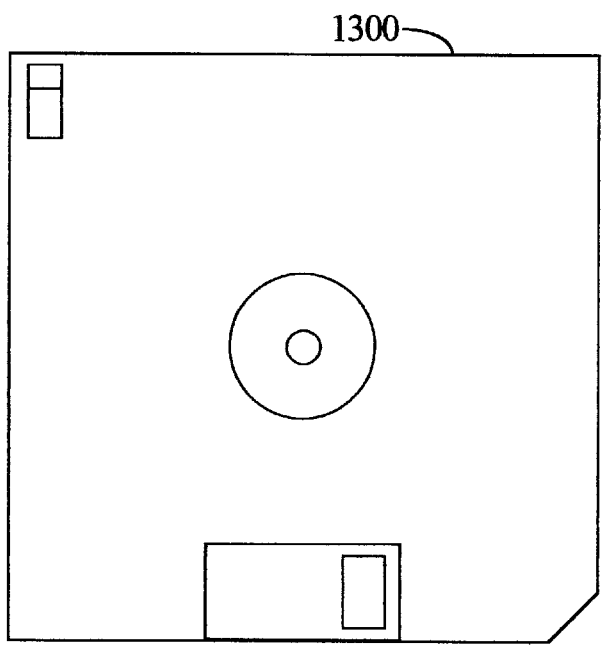
FIG. 13 is a block diagram representing an exemplary signal-bearing medium according to the invention.

This signal-bearing media may comprise RAM (not shown) embodied by the storage 256, as one example. Alternatively, the instructions may be contained in another signal-bearing media, such as a magnetic data storage diskette 1300 (FIG. 13), directly or indirectly accessible by the processor 252. Whether contained in the storage 254, diskette 1300, or elsewhere, the instructions may be stored on a variety of machine-readable data storage media, such as DASD storage, magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

RESERVE Implementation According to Present Invention

Figure 5:
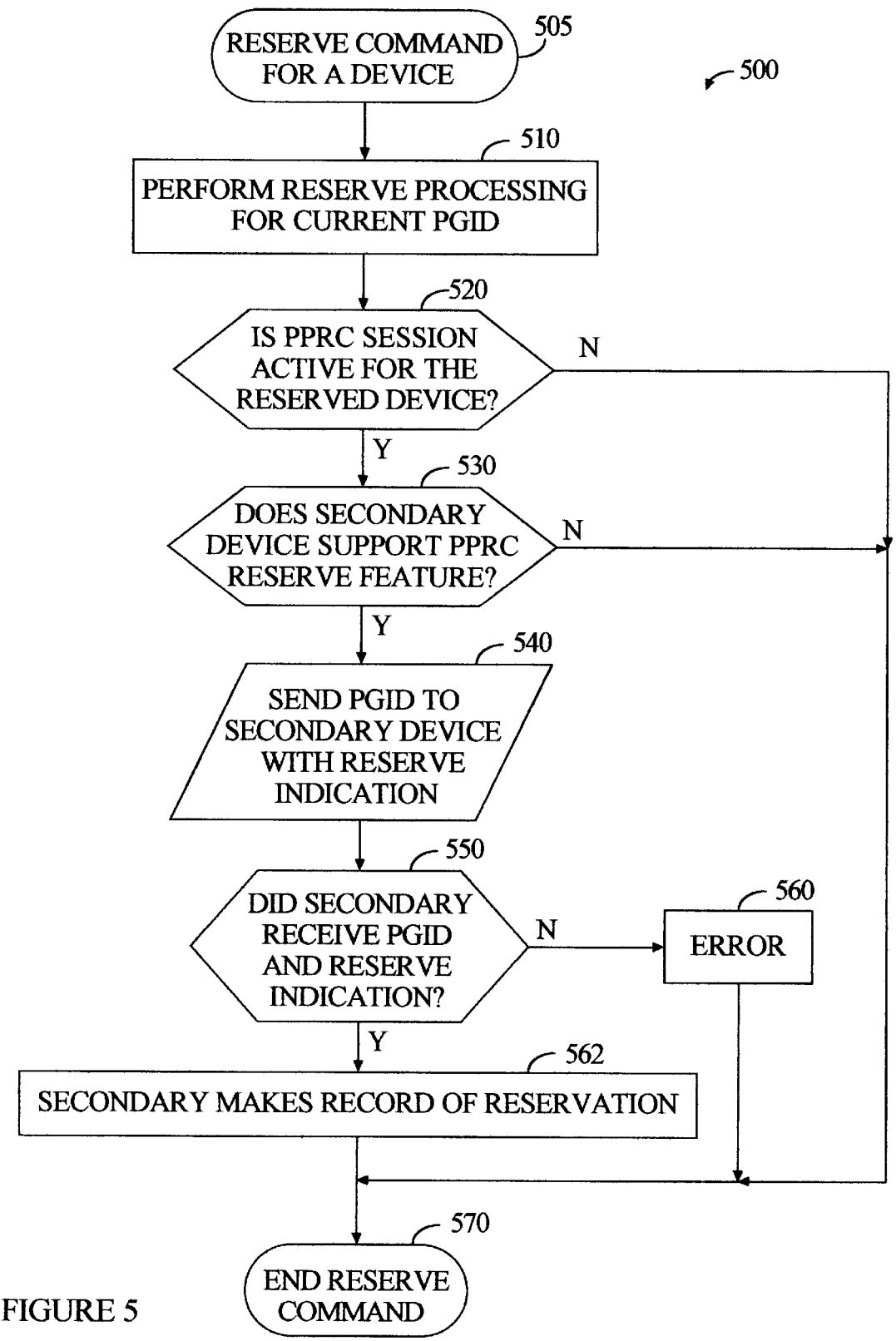
FIG. 5 is a flow diagram of a method for performing a reserve operation in a remote copy duplex pair, according to the invention.

FIG. 5 shows a sequence 500 for performing a reserve operation in the present invention, which differs from prior techniques in several respects. For ease of discussion, with no intended limitation, the sequence 500 is discussed in context of the hardware in FIG. 1. The sequence 500 begins in step 505, where the primary host 101 issues a reserve command to the primary storage controller 103. As an example, this reserve command identifies the reserving host (in this case, the host 101), the "reserved logical device"(in this case, a subpart of the DASD 104), and may take the following exemplary format:

> RESERVE {identity of issuing host, identity of reserved logical device}

More specifically, the host may identify itself by a path group ID (PGID). After step 505, the primary storage controller 103 performs certain reserve processing steps (step 510) for the host's PGID. This includes, for example, storing the PGID locally at the storage controller 103. As other aspects of reserve processing are known to those of skill in this art, further embellishment of reserve processing is omitted. Next, in step 520, the primary storage controller 103 determines whether the reserved logical device is currently operating as a member of a remote duplex pair (i.e., peer-to-peer remote copy or "PPRC"). If the reserved logical device 104 is not operating as a member of a remote duplex pair, the reserve is complete, and the routine 500 jumps from step 520 to step 570, ending the reserve routine 500.

If step 520 finds an active PPRC session for the reserved logical device, however, the primary storage controller 103 proceeds to determine whether the secondary storage controller 106 supports the PPRC reserve feature (step 530), i.e., whether the secondary storage controller 106 honors reserves placed by the primary controller in the event of a primary storage failure, as taught by the present invention. The answer to step 530 may be found, for example, by the primary controller 103 transmitting an appropriate CCW such as a "read device characteristics" command. If the secondary storage controller 106 does not support PPRC reserve, the reserve is complete, and the routine 500 jumps from step 530 to step 570, ending the reserve routine 500.

Otherwise, if the secondary storage controller 106 is compatible with the PPRC feature, the primary storage controller 103 proceeds to send a reserve notification and an identification of the reserve-owning PGID to the secondary storage controller (step 540). In this way, the primary storage controller 103 notifies the secondary storage controller 106 of the reservation. Such notification may be made by a message including a path group ID (PGID) along with the identities of the reserved logical device.

The primary storage controller 103 then queries the secondary storage controller 106 to determine whether the PGID and reserve notification were received (step 550). If not, an error condition is issued (step 560). Otherwise, the secondary storage controller 106 makes a record of this reservation (step 562). Namely, the secondary storage controller 106 locally stores the reserve notification, reserve-owning PGID, and identity of the reserved logical device (step 562). This record is made to protect against failure of the primary storage controller 103 or primary logical device 104, in which event the secondary controller 106 can consult local storage to determine which hosts owned reservations to any logical devices when the failure occurred. As discussed below (step 1130g, FIG. 11A), the secondary controller 106 does not actually implement the reserve until failure occurs at the primary site 114; at this time, the secondary controller 106 configures itself to return a "busy" signal in response to any host requests to access portions of the secondary device 107 that correspond to the reserved logical devices at the primary device 104.

After step 562, the routine 500 ends in step 570.

RELEASE Implementation According to Present Invention

Figure 6:
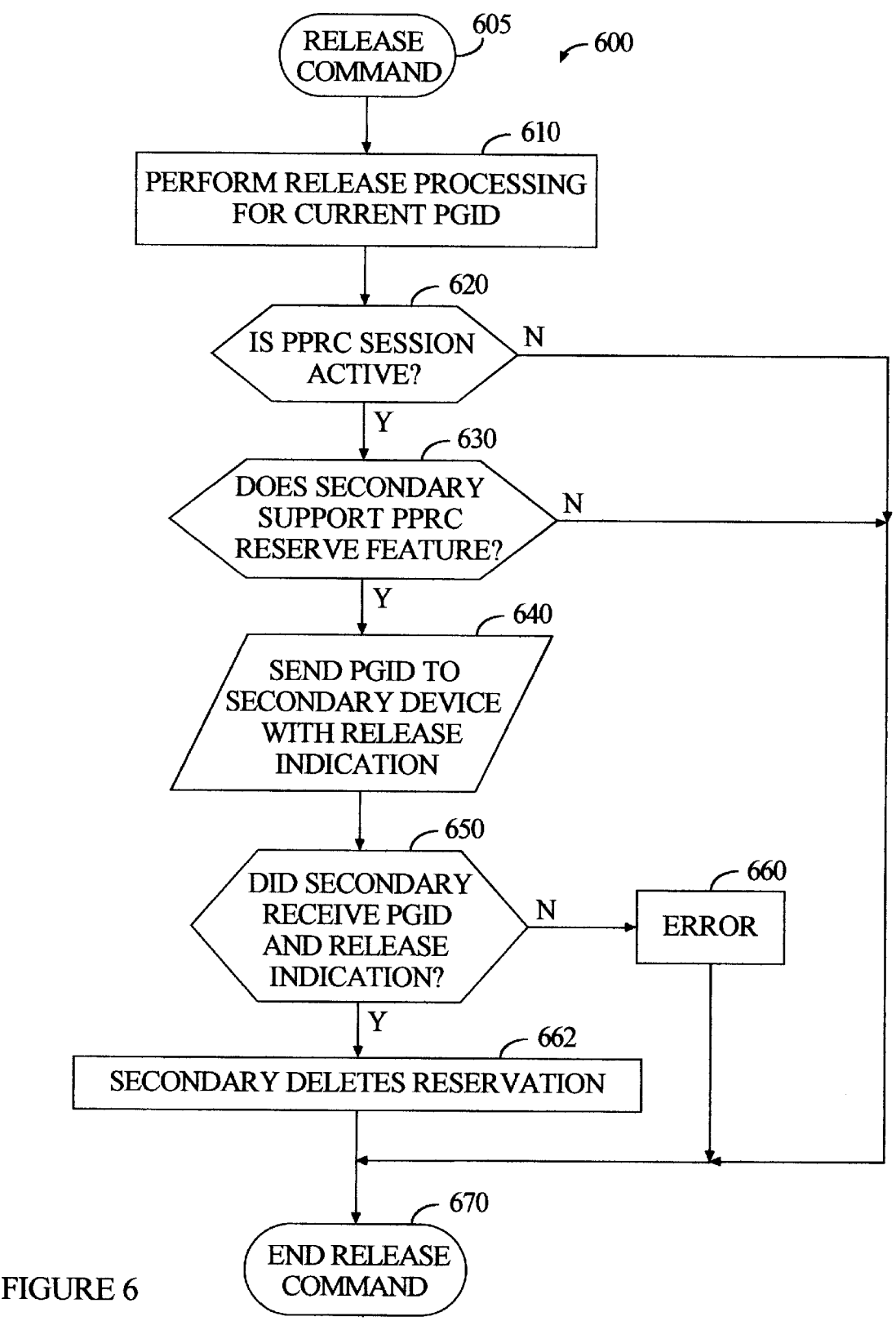
FIG. 6 is a flow diagram of a method for performing a release operation in a remote copy duplex pair, according to the invention.

FIG. 6 shows a sequence for releasing a reserve operation in the present invention, which differs from prior techniques in several respects. For ease of discussion, with no intended limitation, the sequence 600 is discussed in context of the hardware in FIG. 1. The sequence 600 begins in step 605, which issues a release command to the primary storage controller 103. The release command may be issued by the primary host 101, an operator such as a system administrator (not shown), etc. As an example, this release command identifies the reserving host (e.g., the host 101), the reserved logical device (e.g., a subpart of the DASD 104), and may take the following exemplary format:

> RELEASE {identity of issuing host, identity of reserved logical device}

More specifically, the host may identify itself by a PGID. After step 605, the primary storage controller 103 performs certain release processing steps for the host's PGID (step 610). This includes, for example, deleting the PGID from local storage at the storage controller 103. Next, in step 620, the primary storage controller 103 asks whether the released logical device is currently operating as a remote duplex pair (i.e., peer-to-peer remote copy or "PPRC"). If the released logical device is not operating as a member of a remote duplex pair, the routine 600 jumps from step 620 to step 670, ending the release routine 600.

If step 620 finds an active PPRC session, however, the primary storage controller 103 proceeds to determine whether the secondary storage controller 106 supports the PPRC reserve feature (step 630), i.e., whether the secondary storage controller 106 honors reserves placed by the primary controller in the event of a primary storage failure, as taught by the present invention. If not, the release is complete, and the routine 600 jumps from step 630 to step 670, ending the release routine 600.

Otherwise, if the secondary storage controller 106 is compatible with the PPRC feature, the primary storage controller 103 sends a release notification and identification of the reserve-owning PGID to the secondary storage controller (step 640). In this way, the primary storage controller 103 notifies the secondary storage controller 106 of the released reservation. Such notification may be made by a message including a PGID along with the logical devices reserved.

The primary storage controller 103 then queries the secondary storage controller 106 to determine whether the PGID and release notification were received (step 650). If not, an error condition is issued (step 660). Otherwise, the secondary storage controller 106 responds to the release notification by deleting the PGID from its local storage, thereby canceling the tentative reserve (step 662). The reserve was tentative because, as discussed below, the secondary controller 106 was not configured to actually implement the reserve until failure at the primary site 114. After step 662, the routine 600 ends in step 670.

Failure Processing-Overall Sequence

Figure 7:
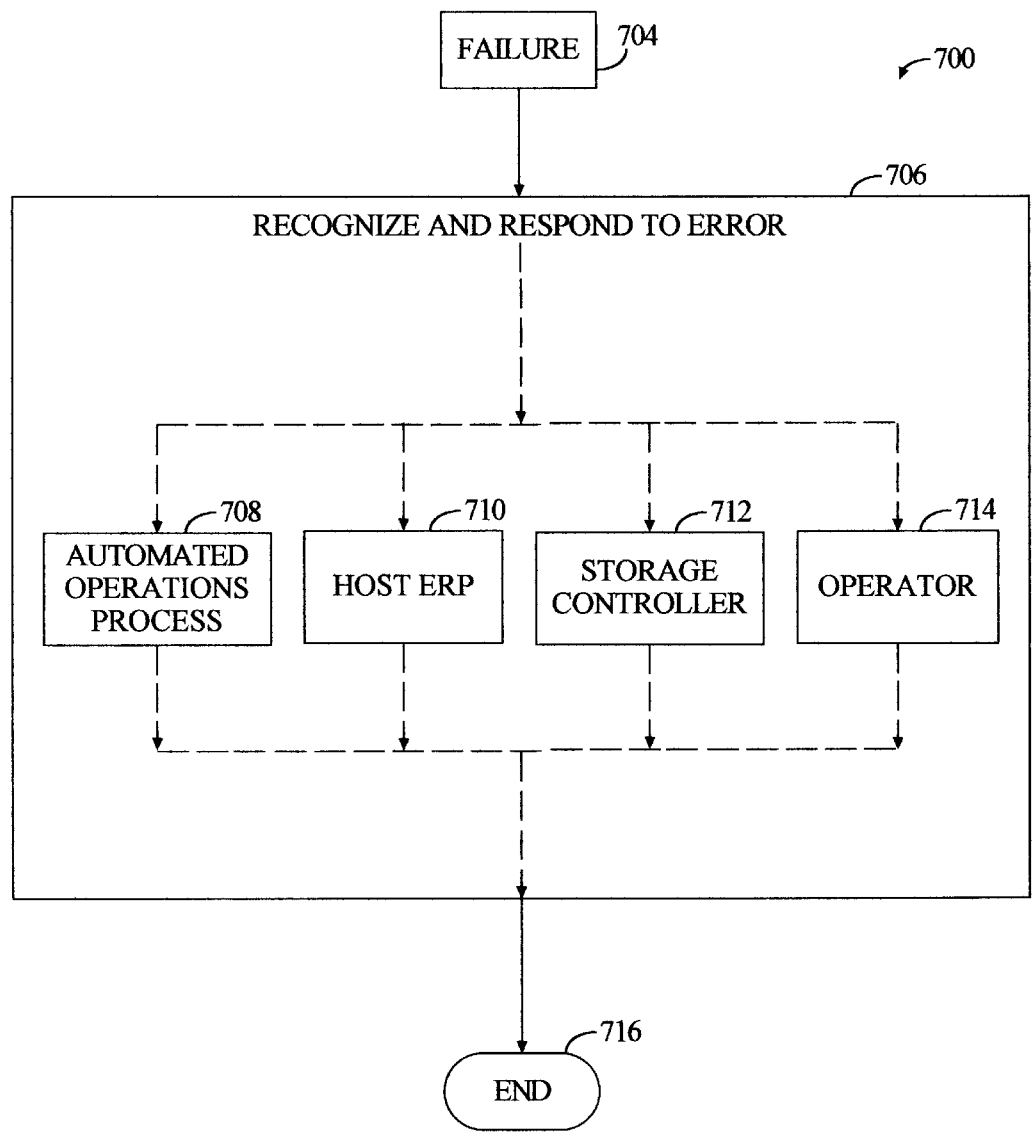
FIG. 7 is an overview of an error processing sequence, according to the invention.

FIG. 7 depicts an overall sequence 700 for processing storage errors, which benefits from the reserve implementation discussed above because the secondary storage controller is able to maintain any primary storage reservations currently in-place at the time of failure at the primary site. For ease of explanation, but without any intended limitation, the example of FIG. 7 is described in the context of the hardware in FIG. 1. The operations 700 are initiated when a failure occurs at the primary site 114 (step 704). This failure may involve failure of the primary storage controller 103, the primary DASD 104, or communications between the host 101, controller 103, and/or DASD 104.

After the failure (step 704), the system 110 recognizes and responds to the failure (step 706). Failure recognition and response may be performed by an automated operations process 708, host ERP 710 (e.g., ERP 102), primary storage controller 712 (e.g., primary storage controller 103), or manually by an operator 714. Step 706 may also involve combinations of the steps 708, 710, 712, 714; one example is where the operator manually recognizes the error, and then institutes the response procedure of another process 708–712.

One important feature performed by each of steps 708–714 is a "device swap," where the primary and secondary sites (or portions thereof) reverse roles. The device swap procedure (FIGS. 11–11A) is discussed in greater detail below. The device swap may also be referred to as a "PDAS switch." In accordance with this invention, the secondary controller 106 provides or limits access to its duplicate DASD 107 to honor any reservations of the primary DASD 104 that were effective when the failure occurred. Additional details of this process are discussed below.

If step 706 succeeds, the system 110 is operational again, with the secondary site 115 operating in place of the (failed) primary site 114. If step 706 does not succeed, appropriate error messages may be issued. After step 706, the routine 700 ends in step 716.

Error Recognition and Response by Automated Operations Process

Figure 8:
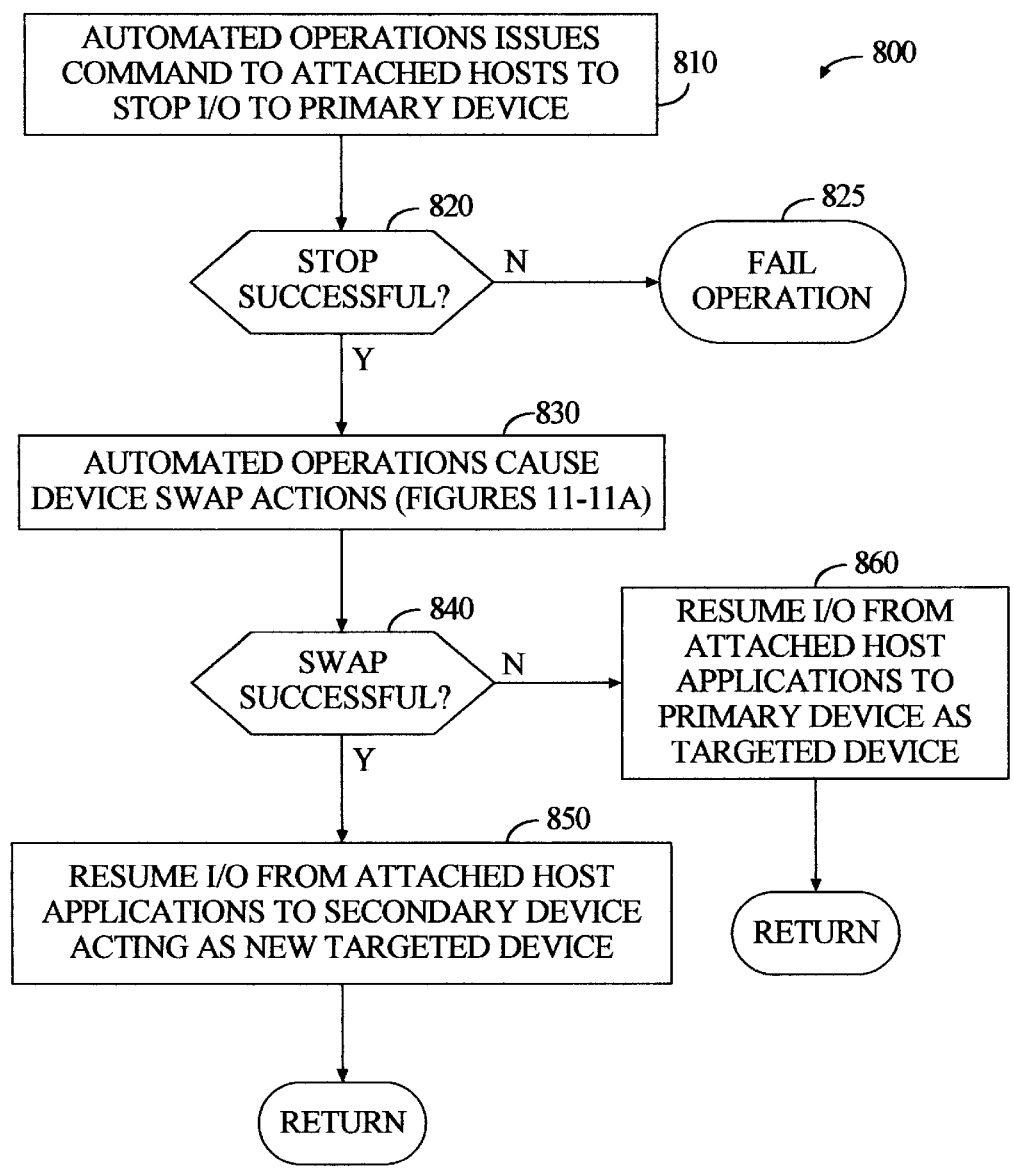
FIG. 8 is a flow diagram of a method whereby an automated operations process detects the need for and invokes the device swap outlined in FIG. 11, according to the invention.

As mentioned above, one of the alternatives for recognizing and responding to primary site storage errors is by "automated operations process"(step 708, FIG. 7). Generally, the automated operations process is performed by a host software component, which examines operating system messages in order to detect primary storage errors. An example of this technique is shown in FIG. 8 by the sequence 800. One important feature of the sequence 800 is use of a "device swap" where the primary and secondary storage sites exchange roles. The device swap operation is discussed below in more detail with the description of the sequence 1000 of FIGS. 11–11A.

Figure 12:
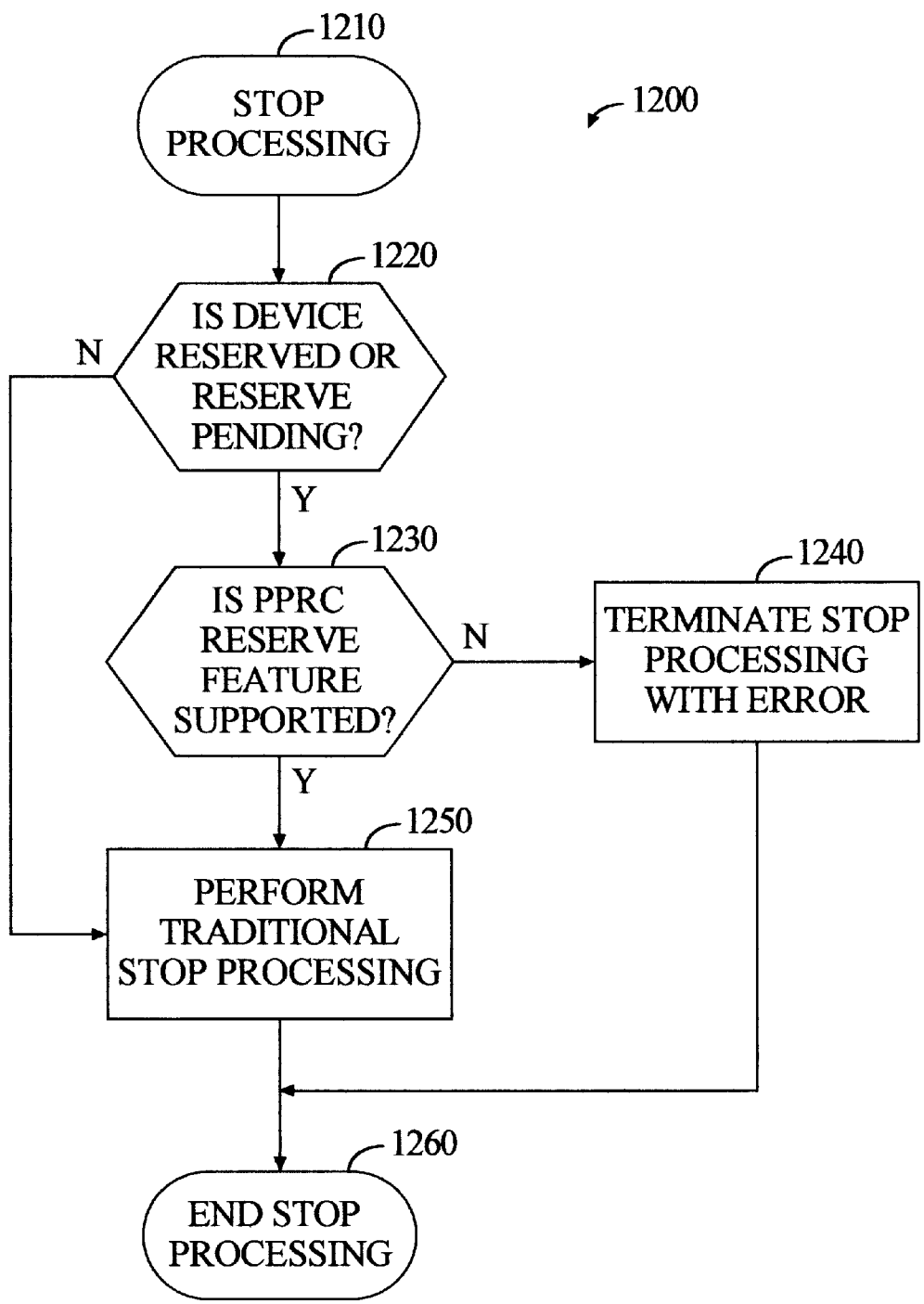
FIG. 12 is a flow diagram of a method for stop processing according to the invention.

The sequence 800 may be initiated, for example, when the primary storage controller 103 or the primary DASD 104 has a planned maintenance action, when the customer installs new DASDs and decides to migrate data from other DASDs to the newly installed DASDs, or when the customer moves certain processing activity from one set of DASDs to another set in managing the workload of the entire system. In step 810, the automated operations process issues a command to the attached host processors 101 requiring them to stop, or quiesce, all I/O operations to the primary DASDs 104. The details of step 810 are discussed in greater detail below by the sequence 1200 (FIG. 12).

After step 810 successfully concludes, the automated operations process checks that all applications running on the attached host processors successfully quiesced all I/O operations to the primary DASD 104 (step 820). If not successful, the automated operations process fails the scheduled action in step 825. Prior to the present invention, one reason for such a failure (step 825) was that the primary device 104 was subject to reservation by a primary host 101. With the present invention, however, there is no failure here because the system can guarantee that the data on the volume remains serialized by the reserve during the duration of the swap and that the system owning the reserve will continually own the reserve after the swap completes and the device is unquiesced.

If the stop is successful, the automated operations process invokes the device swap ("switch") feature in step 830. The device swap operation is discussed below in more detail with the description of the sequence 1000 of FIGS. 11–11A. After step 830, step 840 verifies whether the device swap 1100 completed successfully. If the return code indicated that the device swap 1100 failed, the automated operations process sends a command to all attached host processors 101 to resume running their applications to the primary DASD 104 as the targeted device (step 860). In this case, the secondary DASD remains the shadowing device of the remote copy duplex pair 104, 107. However, if the device swap 1100 succeeded, the automated operations process commands the attached host processor 101 applications to resume I/O operations to the secondary DASD 107 as the targeted device (step 850). Accordingly, the primary DASD 104 becomes the shadowing device of the opposite direction remote copy duplex pair 107, 104. The primary host processor 101 directly sends all subsequent I/O operations and record updates targeted for the primary device to the secondary DASD 107 through channel 109 and the secondary storage controller 106.

Error Recognition and Response by Error Recovery Program

Figure 9:
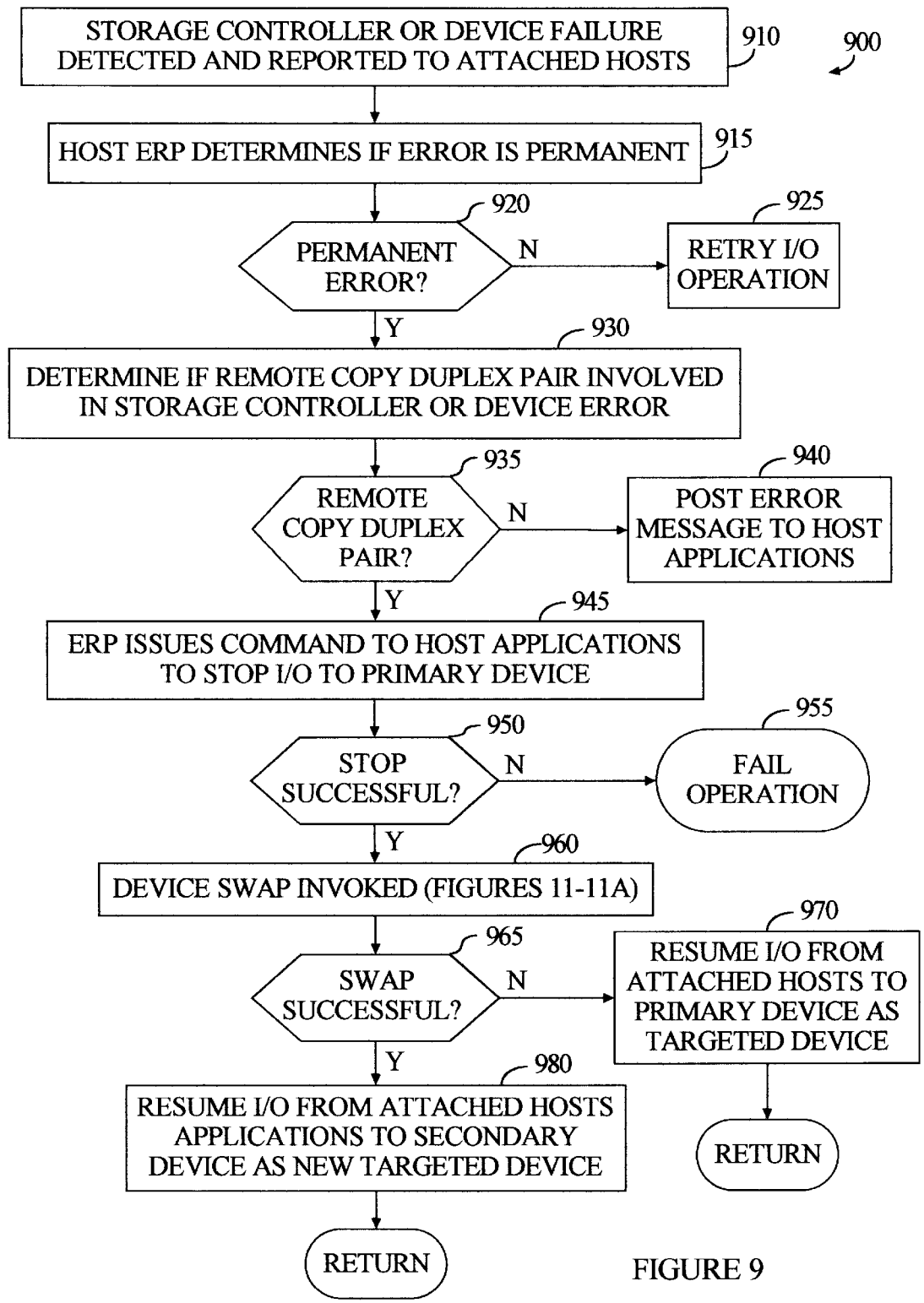
FIG. 9 is a flow diagram of a method whereby an Error Recovery Program (ERP) within the primary host processor detects the need for and invokes the device swap outlined in FIG. 11, according to the invention.

Another alternative for recognizing and responding to primary site storage errors is by "host error recovery program (ERP)" (step 710, FIG. 7). An example of this technique is shown in FIG. 9 by the sequence 900. Generally in FIG. 9, the Error Recovery Program (ERP) 102 within the primary host processor 101 invokes the device swap function 1100 outlined in FIGS. 11–11A. The sequence 900 begins in step 910, when either a failure in the primary storage controller 103 or a permanent error on the primary DASD 104 is detected. When either of these failures occur, an error indication is raised to all attached primary host processors 101, such as a "unit check next start" I/O signal. The ERP 102 gains program control from the applications running within the primary host processor 101 to take actions on the reported failures. The host ERP 102 determines if the error is a permanent error in step 915, before the applications notice the error.

Step 920 checks whether the host ERP was able to recover the error. If the error is not permanent but recoverable, the host I/O operation is retried in step 925 and the applications running with the primary host processor never receive the failure. Otherwise, if the error is permanent, the host ERP stores an error code ("failure code") in a maintenance log to assist in future corrective action (step 930). Also in step 930, the host ERP determines whether the failure is in a DASD that forms a remote copy duplex pair or a storage controller connected to one or more remote copy duplex pairs. If the permanent error does not relate to a remote copy duplex pair, the host ERP simply reports the permanent error in step 940 to the applications running in the attached primary host processors 101. Otherwise, if the permanent error relates to a remote copy duplex pair, the host ERP issues a command in step 945 to the host applications to stop, or quiesce, all I/O operations and record updates to the primary DASDs 104 affected by the permanent error. The details of step 945 are discussed in greater detail below by the sequence 1200 (FIG. 12).

After step 945, step 950 verifies that all the attached primary host processors successfully quiesced the I/O operations to the affected primary DASDs 104. If not, the host ERP fails the operation in step 955 and again reports the permanent failure to the attached host applications. Prior to the present invention, one reason for such a failure (step 955) was that some or all of the primary device 104 was reserved to a primary host. With the present invention, however, there is no failure because the system can guarantee that the data on the volume remains serialized by the reserve during the duration of the swap and that the system owning the reserve will continually own the reserve after the swap completes and the device is unquiesced. In contrast to step 955, if the I/O operations were successfully quiesced to the affected primary DASDs 104, the host ERP invokes the device swap function 1100 in step 960. The device swap operation is discussed below in more detail with the description of the sequence 1000 of FIGS. 11–11A. Step 965 then checks whether the device swap 1100 completed successfully. If the device swap failed, the host ERP issues a command to the attached host applications in step 970 to resume I/O operations and record updates to the primary DASD 104 as the targeted device. In this case, the secondary DASD remains the shadowing device of the remote copy duplex pair 104, 107. However, if the device swap 1100 was successful, the host ERP commands the attached host applications in step 980 to resume I/O operations to the secondary DASD 107 as the targeted device. Accordingly, the primary DASD 104 is the shadowing device of the opposite direction remote copy duplex pair 107, 104. The primary host processor 101 directly sends all subsequent I/O operations and record updates targeted for the primary device to the secondary DASD 107 through channel 109 and the secondary storage controller 106.

Error Recognition and Response by Primary Storage Controller

Figure 10:
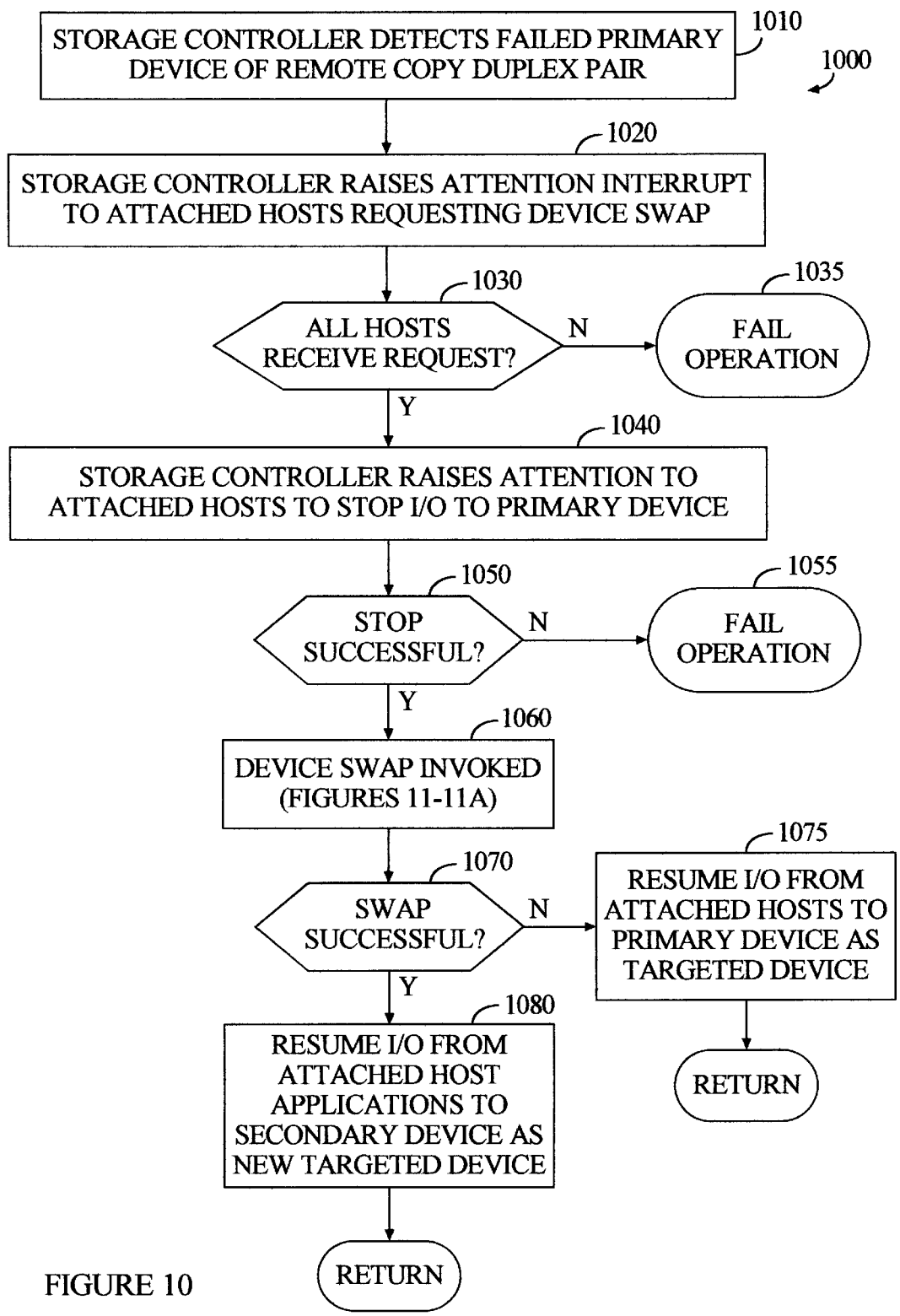
FIG. 10 is a flow diagram of a method whereby the storage controller at the primary site detects the need for and invokes the device swap outlined in FIG. 11, according to the invention.

As mentioned above, another alternative for recognizing and responding to primary site errors is by using the primary storage controller (step 712, FIG. 7). As example of this technique is shown in FIG. 10 by the sequence 1000. Generally, in FIG. 10, a storage controller 103 at the primary site invokes the device swap function 1100 outlined in FIGS. 11–11A. This method is initiated at the primary storage controller 103 and occurs under the same circumstances needed by the automated operations process referred to in FIG. 8. Additionally, the primary storage controller 103 can invoke the device swap function 1100 when it detects a permanent error on the primary DASD 104.

The sequence 1000 begins in step 1010, where the primary storage controller 103 detects a condition that potentially warrants the device swap function 1100, such as a permanent device error on a primary DASD 104 or customer-initiated maintenance action. In step 1020, the primary storage controller 103 raises an attention interrupt to the attached host processors 101 at the primary site requesting a device swap 1100. Each attached host processor 101 must process this request and respond to the primary storage controller. For a device swap 1100 to occur, each host processor must also allow, or grant permission to, the primary storage controller 103 to proceed with the device swap operation 1100.

Step 1030 determines whether the attached primary host processors 101 responded to primary storage controller 103 request allowing the storage controller 103 to proceed. If not, the primary storage controller 103 raises an attention interrupt to the attached host processors 101 in step 1035 indicating that the operation failed. Otherwise, if the attached host processors 101 responded favorably to the storage controller's 103 request to proceed, the primary storage controller 103 issues an attention action to the attached host processors 101 in step 1040 requesting that all applications running with the hosts 101 quiesce their I/O operations to the primary DASD 104. The details of step 1040 are discussed in greater detail below by the sequence 1200 (FIG. 12).

After step 1040, step 1050 checks whether the attached host applications successfully quiesced the I/O operations to the primary DASD 104. If not, the primary storage controller 103 notifies the attached host processors 101 in step 1055 indicating that the operation failed. Prior to the present invention, one reason for such a failure (step 1055) to occur was that the primary device 104 was subject to a reservation by a primary host 101. With the present invention, however, there is no failure because the system can guarantee that the data on the volume remains serialized by the reserve during the duration of the swap and that the system owning the reserve will continually own the reserve after the swap completes and the device is unquiesced. In contrast to step 1055, if the host applications successfully quiesced all I/O operations to the primary DASD 104, the primary storage controller 103 invokes the device swap function 1100 in step 1060. The device swap operation 1100 is discussed below in more detail with the description of the sequence 1100 of FIGS. 11–11A. The storage controller 103 manages the terminating of the previous remote copy pair and the establishing of the new opposite direction remote copy pair. The storage controller also updates its copies of the remote copy pair status contained in either the shared control array 434 or the NVS 422 (FIG. 4) and prompts the attached host processors to update their control blocks with the device address of the secondary DASD 107 as the primary, targeted device of the opposite direction remote copy pair 107, 104.

Step 1070 determines whether the device swap of step 1060 succeeded. If the device swap 1060 failed, the primary storage controller 103 raises an attention to the attached host processors 101 in step 1075 requesting that the host applications resume I/O operations with the primary DASD 104 still the targeted device of the remote copy duplex pair 104, 107. In contrast to step 1075, if the device swap 1100 completed successfully, the primary storage controller raises an attention to the attached host processors 101 in step 1080 requesting the host applications to resume I/O operations to the secondary DASD 107 as the targeted device of the opposite direction remote copy duplex pair 107, 104. In this event, the primary DASD 104 becomes the shadowing device of the remote copy duplex pair 107, 104. The primary host processor 101 directly sends all subsequent I/O operations and record updates targeted for the primary device to the secondary DASD 107 through channel 109 and the secondary storage controller 106.

Device Swap

As mentioned above, the invention provides various alternatives for recognizing and responding to primary storage errors (FIG. 7, steps 708–714). One feature of each alternative 708–714 is the use of the device swap routine 1100. The device swap routine is performed in response to a failure in the storage controller 103, and implements a switch to the shadowing DASD 107 from the primary DASD 104 to maintain continued access to the data stored within the remote copy duplex pair 104, 107. The sequence 1100 describes a method for swapping ("switching") the secondary data storage device with the primary data storage device of a remote copy duplex pair. The sequence 1100 is invoked by various sources, depending upon to which source 708–714 (FIG. 7) recognized the primary storage error and invoked the device swap. The device swap routine 1100 is now described in greater detail with reference to FIGS. 11–11A.

Prior to the present invention, data access methods simply redirected a host processor 101 request for data from a failed primary DASD 104 to the secondary, or shadowing, DASD 107. This redirection of the host request required that both the primary storage controller 103 and the secondary storage controller 106 be operating without failure, since the data access path from the primary host processor 101 to the secondary DASD 107 went through both storage controllers 103, 106. To illustrate, a redirected request from the primary host processor 101 would be routed along the channel 112 to the primary storage controller 103, then across the communication links 108 to the secondary storage controller 106, and finally to the secondary DASD 107. A permanent error in the primary storage controller 103 prohibited access to the data within the remote copy duplex pair 104, 107 until the proper maintenance action (e.g., manual repair) could recover the error.

In contrast, a disaster recovery system 110 with the device swap feature 1100 of the presently described invention provides a path to the data stored at the secondary DASD 107 for the primary host processor 101 without routing through the primary storage controller 103. Here, the primary host processor 101 can directly access the secondary DASD 107 through the channel 109 and the secondary storage controller 106.

The sequence 1100 is invoked in response to a failure occurring at the primary site 114. More specifically, this failure may occur at the primary storage controller 103, channel 112, primary DASD 104, etc. First, step 1110 determines the current status of the remote copy duplex pair 104, 107, i.e., whether the primary DASD 104 and the secondary DASD 107 currently form a valid remote copy pair. To form a valid remote copy pair, all record updates transferred to the primary DASD 104 must have been successfully copied to the secondary DASD 107. To maintain data integrity, a device swap is only performed on a remote copy duplex pair where the secondary DASD 107 is an exact replica of the primary DASD 104. If the remote copy duplex pair is not valid, step 1120 routes control to step 1125, which fails the device swap operation 1100 and returns control to the calling function.

Otherwise, if the duplex pair is valid, step 1120 advances to step 1130, which terminates the current remote copy duplex pair 104, 107, i.e., stops making updates from the primary site 114 to the secondary site 115. Next, step 1131 determines whether the primary logical device was reserved but the PPRC reserve features is not supported. If so, the device swap cannot succeed because reservation cannot be transferred to the secondary device in this case. In this event, I/O to/from the failed device 104 is prevented, and a permanent error returned to any hosts requesting data (step 1132). Otherwise, if the device was not reserved, or the device was reserved but the PPRC reserve features is supported, the routine 1110 advances to step 1140. In step 1140, an opposite direction remote copy duplex pair is established such that the secondary DASD 107 becomes the primary targeted device for all subsequent primary host 101 I/O operations to the duplex pair 104, 107. Accordingly, the primary DASD 104 becomes the shadowing device for all subsequent I/O operations from the primary host processor 101 directed to the duplex pair 107, 104.

Step 1150 then verifies that the opposite direction remote copy duplex pair was successfully established. If not, step 1155 fails the device swap operation 1100 and returns control to the calling function or routine. Otherwise, if the opposite direction remote copy duplex pair was established, step 1160 suspends the newly established opposite direction remote copy duplex pair 107, 104. The pair is suspended if the device swap 1100 was caused by a failure in the primary storage controller 103 or the primary DASD 104. In this case updates to the secondary DASD 107 (now operating as the primary device) cannot be implemented at the primary DASD 104 (now operating as the shadow device) due to the primary storage controller failure. Without such a failure, the opposite direction remote copy duplex pair 107, 104 need not be suspended. If the opposite direction duplex pair 107, 104 is suspended, change recording (optional) may be set for the secondary DASD 107. With change recording set, subsequent record updates to the secondary DASD 107 are monitored within the secondary subsystem such that when the primary DASD 104 is resynchronized with the secondary DASD 107, the updated device tracks (instead of the entire volume) are copied to the primary DASD 104.

Next, the host initiating the swap operation compares a set of device characteristics for the primary DASD 104 and the secondary DASD 107 (step 1170). These device characteristics may include, for example, the device type, the device model, and the track (or data) format of the device. Step 1180 determines whether the device characteristics for the secondary DASD 107 match the device characteristics for the primary DASD 104. If they do not match, step 1185 fails the device swap operation 1100. In this case, the original remote copy duplex pair is reestablished with the primary DASD 104 as the targeted device and the secondary DASD 107 as the shadowing device before returning control to the calling routine. Otherwise, if the device characteristics match, step 1190 updates the control blocks in the applications running within the primary host processor 101 to substitute the device address for the secondary DASD 107 with the primary DASD 104. Thus, subsequent I/O operations and record updates from the primary host applications will execute directly to the secondary DASD 107 instead of the primary DASD 104. Step 1195 indicates the device swap 1100 completed successfully and returns an indication of this success to the calling function or routine.

Terminate Remote Copy Duplex Pair—More Detail

Figure 11:
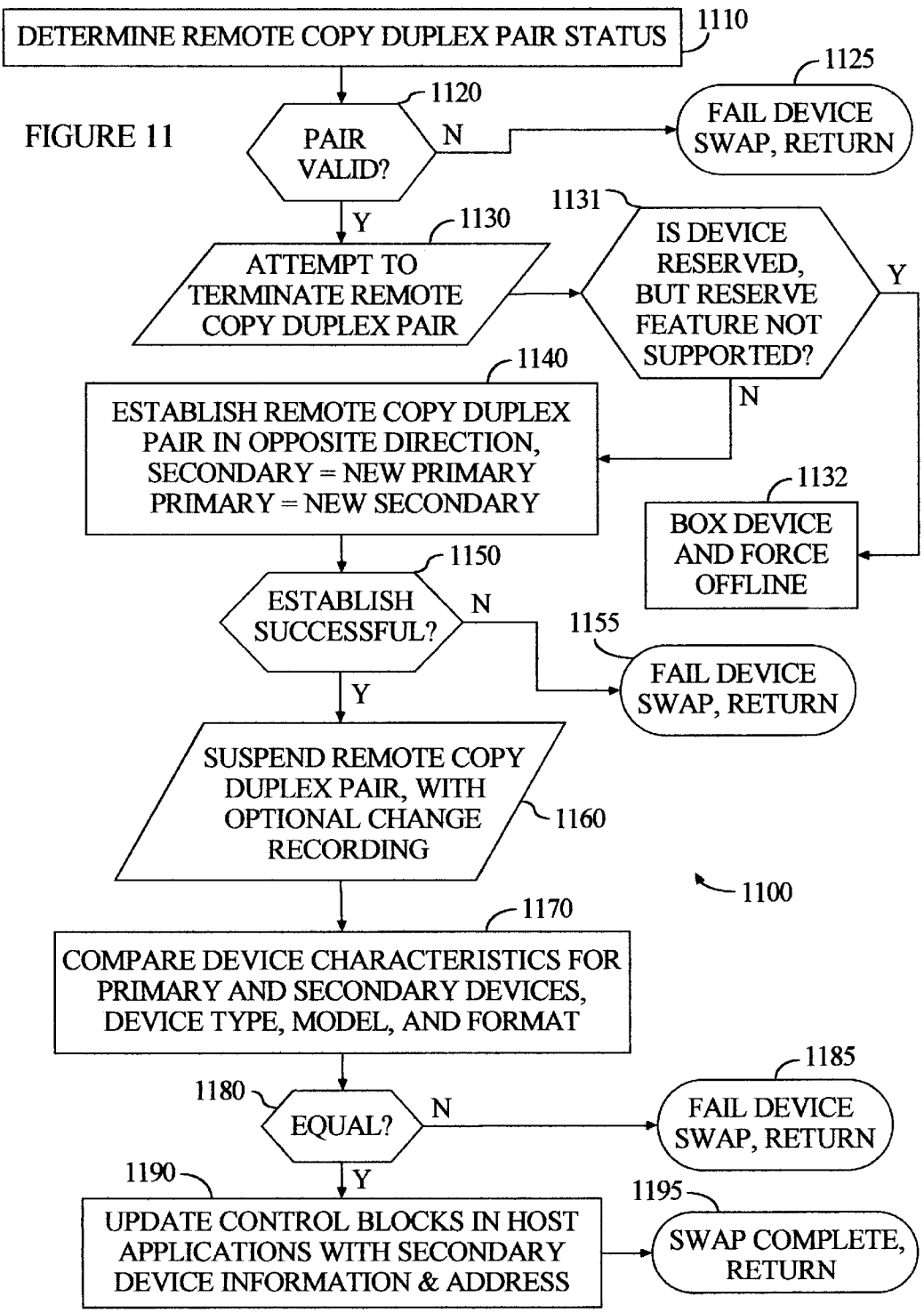
FIG. 11 is a flow diagram of a method for device swapping such that host directed I/O operations are switched from a primary data storage device of a remote copy duplex pair to a secondary data storage device of the duplex pair, according to the invention.
Figure 11A:
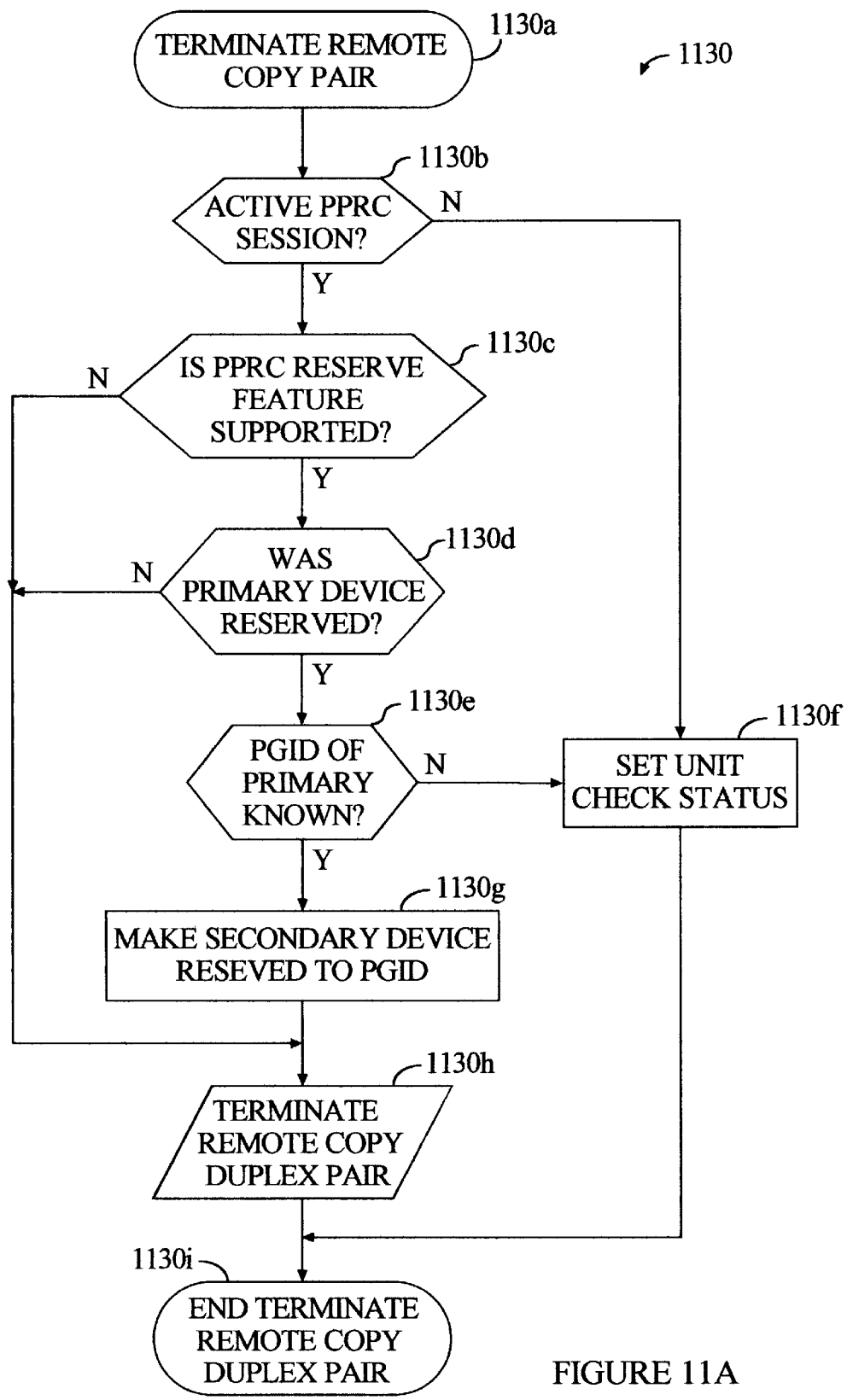
FIG. 11A is a flow diagram of a method for terminating a remote copy duplex pair, according to the invention.

FIG. 11A illustrates step 1130 of FIG. 11 in greater detail. Step 1130 is performed by the secondary control unit 106 and, as mentioned above, attempts to stop updates from the primary site 114 to the secondary site 115. This process is initiated by the host to the secondary control unit via the Performance Subsystem Function (PSF) CCW. This is referred to as "terminate remote copy duplex pair."

The routine 1130 is initiated in step 1130a. In step 1130b, the secondary control unit 106 invoking the routine 1100 determines whether there is an active PPRC session, i.e. whether or not the subject device is an active secondary device of a PPRC pair. If not, then step 1130f sets error status (unit check) to be sent back to the channel subsystem, with the sense data indicating that the device is not in an active PPRC pair session. If a PPRC session is active, however, the control unit 106 determines whether the system 110 supports the PPRC reserve feature as discussed herein (step 1130e). If PPRC reserve is not supported, normal terminate pair processing is performed (step 1130h). Terminate pair processing may be done, for example, by host issuance of an appropriate PSF command known to those of ordinary skill in the art.

If the PPRC reserve feature is supported, the secondary control unit 106 proceeds to determine whether the primary device was reserved at the time of the storage failure (step 1130d). If not, normal terminate pair processing is performed (step 1130h). If the primary device was reserved, then the secondary control unit 106 determines whether the PGID of the primary device is known to the secondary control unit 106 (step 1130e). If not, step 1130f returns an error. Otherwise, if the PGID is known, it is possible to make the secondary device reserved to the same PGID that had reserved the primary device. This is done in step 1130g, and involves updating internal state information for the logical device in the control unit 106; this may involve, for example, storing data representing the reserved logical device and the reserve-owning PGID of the host into an appropriate table or other data structure at the secondary control unit 106. After step 1130g, step 1130h can perform normal terminate pair processing. After step 1130h, the routine 1130 ends in step 1130i.

Stop Processing

FIG. 12 depicts a sequence 1200 for terminating I/O to the primary DASD 104. As discussed above, the sequence 1200 is invoked by the routines 800 (step 810), 900 (step 945), and 1000 (step 1040). The process 1200 may be referred to as "stop processing."

For ease of illustration, the sequence 1200 is illustrated in context of the hardware of FIG. 1. The sequence 1200 is initiated in step 1210 when a stop processing command is issued. This command (step 1210) may be issued manually, such as by system administrator or other operator action. Alternatively, the stop processing command may be issued automatically by a component of the system 110 such as a primary host 101. Automated issuance of the stop processing command may occur, for example, in response to a determination that the failed primary components are operational again. Issuance of the stop processing command occurs as shown in the invoking step of the routines 800, 900, or 1000, as discussed above.

After step 1210, step 1220 asks whether the primary DASD 104 was reserved or there was a reserve pending at the time of failure. Step 1220 is performed by the host (either primary or secondary) to which the stop processing command of step 1210 was issued. Step 1220 may be implemented, for example, by this host issuing an appropriate Sense Path Group ID CCW to the primary controller 103. If the primary DASD 104 was not subject to a completed or pending reserve, traditional stop processing techniques are used in step 1250. An example of traditional stop processing is discussed in IBM Research Disclosure n342, October 1992, entitled "A Method and Apparatus for Non-Disruptive Device Level Quiesce."

If the primary DASD 104 was subject to a completed or pending reserve, however, step 1220 proceeds to step 1230, Step 1230 asks whether the system 110 is configured to support the PPRC reserve feature, as discussed herein. This may be determined, for example, by issuing an appropriate "read device characteristics" CCW to the primary controller 103. If PPRG reserve is not supported, then traditional stop processing cannot successfully complete, and an error is issued in step 1240. Stop processing will fail if the device is reserved or reserve pending and the reserve feature is not supported. Swap processing will be rejected if the device is not in the STOPed state. If the system 110 supports the PPRC reserve feature, however, traditional stop processing is available to resume normal operation. In this case, step 1230 advances to step 1250, where traditional stop processing is performed. After step 1250, stop processing ends in step 1260.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. For example, the device swap, or switch, function has been particularly described within a synchronous remote copy, or remote data duplexing, environment. The device swap function may also be used within an asynchronous remote copy, or remote data duplexing, system for disaster recovery. In addition, the storage devices are not meant to be limited to DASD devices.

What is claimed is:

1. A method for operating a data backup system including a primary storage site having a counterpart secondary storage site, each site including a storage controller and a storage, where the system is configured to receive and store data at the primary site and forward the received data to the secondary site for storage therein to mirror contents of the primary site, the primary and secondary sites being coupled to one or more hosts, the method comprising operations of:

the primary controller receiving reserve requests from the hosts, each reserve request identifying a different part of the primary storage, and in response, the primary controller reserving each identified part to its requesting host by permitting only the requesting host to write to that part;

the primary controller notifying the secondary controller of reservations of the primary storage; and upon detection of an error occurring at the primary site, performing a switch operation comprising:

configuring the system to stop mirroring contents of the primary site at the secondary site;

the secondary controller determining whether any parts of the primary storage are reserved;

the secondary site operating in substitution for the primary site to satisfy host requests to exchange data with the primary storage by exchanging the requested data with the secondary storage instead; and where, if any part of the primary storage is reserved, the operation of the secondary controller in substitution for the primary site additionally includes reserving counterparts of the secondary storage corresponding to reserved parts of the primary storage by permitting writing to each counterpart only by its reserving host.

2. The method of claim 1, where the operation of the primary controller notifying the secondary controller comprises transmitting codes identifying the reserving hosts.

3. The method of claim 2, the codes comprising path group identifiers.

4. The method of claim 1, the operations further comprising:

the primary controller receiving a release request from a first host identifying a part of the primary storage reserved by that host, and in response, the primary controller canceling the reservation by permitting all hosts to write to that part of the primary storage, and notifying the secondary controller of the canceled reservation.

5. The method of claim 1, the switch operation further comprising:

configuring the system to begin mirroring changes from the secondary site to the primary site.

6. The method of claim 1, where each part comprises one of the following: all of the primary storage, a logical device of the primary storage, a physical device, a subpart being less than all of the primary storage.

7. The method of claim 1, the operations further comprising:

responsive to the primary controller notifying the secondary controller of a reservation, the secondary controller storing a representation of the reservation.

8. The method of claim 7, the operation of the secondary controller determining whether any parts of the primary storage are reserved comprises retrieving any stored representations of reservations to identify reserved parts of the primary storage.

9. The method of claim 1, the operation of the primary controller reserving parts of the primary storage further including the primary controller permitting reading of each part only by its respective reserving host.

10. The method of claim 1, the operation of the secondary controller reserving counterparts of the secondary storage further including the secondary controller permitting reading of each counterpart only by its respective reserving host.

11. A method for operating a data backup system including a primary storage site having a counterpart secondary storage site, each site including a storage controller and a storage, where the system is configured to receive and store data at the primary site and forward the received data to the secondary site for storage therein to mirror contents of the primary site, the primary and secondary sites being coupled to one or more hosts, where the primary controller is additionally programmed to receive reserve requests from the hosts, each reserve request identifying a part of the primary storage, and in response, the primary controller is programmed to reserve each identified part to the requesting host by permitting only the requesting host to write to the identified part, the primary controller also notifying the secondary controller of the reservations, the method comprising operations of:

responsive to detection of an error occurring at the primary site, performing a switch operation comprising:

configuring the system to stop mirroring contents of the primary site at the secondary site;

the secondary controller determining whether any parts of the primary storage are reserved; and the secondary site operating in substitution for the primary site to satisfy host requests to exchange data with the primary storage by exchanging the requested data with the secondary storage instead, where if any parts of the primary storage are reserved, the operation of the secondary site in substitution for the primary site additionally includes reserving counterparts of the secondary storage corresponding to reserved parts of the primary storage by permitting writing to each counterpart only by its reserving host.

12. A data backup system comprising:

primary and secondary storage sites each including a controller and a storage, where the primary and secondary storage sites are programmed to receive and store data at the primary site and forward the received data to the secondary site for storage therein to mirror contents of the primary site, the primary and secondary sites being coupled to one or more hosts;

where the primary site is programmed to perform operations including:

receiving reserve requests from the hosts, each reserve request identifying a different part of the primary storage, and in response, the primary controller reserving each identified part to its requesting host by permitting only the requesting host to write to that part;

notifying the secondary controller of reservations of the primary storage; and where the secondary site is programmed, in response to an error condition occurring at the primary site, to perform operations comprising:

ceasing to mirror contents of the primary site at the secondary site;

determining whether any parts of the primary storage are reserved;

operating in substitution for the primary site to satisfy host requests to exchange data with the primary storage by exchanging the requested data with the secondary storage instead; and where, if any part of the primary storage is reserved, the operation of the secondary controller in substitution for the primary site additionally includes reserving counterparts of the secondary storage corresponding to reserved parts of the primary storage by permitting writing to each counterpart only by its reserving host; and a communications link between the primary and secondary sites.

13. The system of claim 12, the communications link comprising a communications path between the primary and secondary storage controllers.

14. The system of claim 12, the communications link comprising a communications path between the secondary storage controller and at least one of the hosts.

15. The system of claim 12, further including:
one or more hosts coupled to the primary and secondary sites, where the communications link comprises a command path between the primary and secondary sites via one or more of the hosts.

16. The system of claim 12, where the operation of primary controller notifying the secondary controller comprises transmitting codes identifying the reserving hosts.

17. The system of claim 16, the codes comprising path group identifiers.

18. The system of claim 12, the primary controller being further programmed to perform operations comprising:
the primary controller receiving a release request from a first host identifying a part of the primary storage reserved by that host, and in response, the primary controller canceling the reservation by permitting all hosts to write to that part of the primary storage, and notifying the secondary controller of the canceled reservation.

19. The system of claim 12, the primary and secondary controllers being further programmed to respond to an error condition by starting to mirror changes from the secondary site to the primary site.

20. The system of claim 12, where each part comprises one of the following: all of the primary storage, a logical device of the primary storage, a physical device, a subpart being less than all of the primary storage.

21. The system of claim 12, the secondary controller being further programmed to perform operations comprising:
responsive to the primary controller notifying the secondary controller of a reservation, the secondary controller storing a representation of the reservation.

22. The system of claim 21, the operation of the secondary controller determining whether any parts of the primary storage are reserved comprises retrieving any stored representations of reservations to identify reserved parts of the primary storage.

23. The system of claim 12, the operation of the primary controller reserving parts of the primary storage further including the primary controller permitting reading of each part only by its respective reserving host.

24. The system of claim 12, the operation of the secondary controller reserving counterparts of the secondary storage further including the secondary controller permitting reading of each counterpart only by its respective reserving host.

* * * * *